United States Patent
Yang

(10) Patent No.: US 11,724,630 B1
(45) Date of Patent: Aug. 15, 2023

(54) COMBINATION TABLE AND TABLE-ON-WHEEL STRUCTURE

(71) Applicant: FORMOSA SAINT JOSE CORPORATION, Taipei (TW)

(72) Inventor: Ming-Shun Yang, Taipei (TW)

(73) Assignee: FORMOSA SAINT JOSE, CORP., Taipei (TW)

( * ) Notice: Subject to any disclaimer, the term of this patent is extended or adjusted under 35 U.S.C. 154(b) by 0 days.

(21) Appl. No.: 17/679,131

(22) Filed: Apr. 8, 2022

(51) Int. Cl.
*B60N 3/00* (2006.01)
*A47B 37/00* (2006.01)
*A47B 3/06* (2006.01)

(52) U.S. Cl.
CPC ............... *B60N 3/001* (2013.01); *A47B 3/06* (2013.01); *A47B 37/00* (2013.01)

(58) Field of Classification Search
CPC .............. B60N 3/00; A47B 3/06; A47B 37/00
USPC .......................................................... 108/44
See application file for complete search history.

(56) References Cited

U.S. PATENT DOCUMENTS

| | | | | | |
|---|---|---|---|---|---|
| 2,833,608 | A * | 5/1958 | Tobias | ................... | B60N 3/001 108/44 |
| 4,800,987 | A * | 1/1989 | Liles | ........................ | E06C 5/02 182/206 |
| 4,947,961 | A * | 8/1990 | Dudley | ................... | B60R 3/007 280/165 |
| 5,111,909 | A * | 5/1992 | Liu | ......................... | B60R 3/007 280/165 |
| 5,133,429 | A * | 7/1992 | Densley | .................. | B60R 3/007 280/165 |
| 6,767,023 | B1 * | 7/2004 | Nicholson | ............... | B60R 3/007 280/165 |
| 2006/0027422 | A1 * | 2/2006 | Zhang | ..................... | B60R 3/007 182/150 |
| 2006/0157301 | A1 * | 7/2006 | Embretsen | ................ | E06C 5/02 182/150 |
| 2006/0226624 | A1 * | 10/2006 | Chen | ....................... | B60R 3/007 280/165 |
| 2007/0256896 | A1 * | 11/2007 | Huang | ..................... | B60P 3/36 182/150 |

(Continued)

FOREIGN PATENT DOCUMENTS

TW I716331 B * 1/2021

*Primary Examiner* — Daniel J Rohrhoff
(74) *Attorney, Agent, or Firm* — Ian B. Oglesby

(57) ABSTRACT

The present invention discloses combination tables and table-on-wheel structures. Each combination table includes two identical table-on-wheel structures connected side by side with two connection rods and stands firmly on grounds, roads or on object surfaces whether rough or smooth, flat or inclined. Each table-on-wheel structure includes a desktop frame; a stand frame; and two tail rods or connection rods connected together. With the implementation of the present invention, the combination tables or the table-on-wheel structures have the special benefits of being easy to set up or operate; and being able to stand firmly on the ground, no matter it is a level ground, a rough ground or a sloping ground. Each table-on-wheel structure sets firmly upon and applies to all kinds of wheels, whether large or small, and can thus be applied to all kinds of cars. With the foot frames of both the combination tables or the table-on-wheel structures folded at the first joints, convenient storage or transportations are made possible.

12 Claims, 22 Drawing Sheets

(56) References Cited

U.S. PATENT DOCUMENTS

| | | | |
|---|---|---|---|
| 2016/0157603 A1* | 6/2016 | Graham | A47B 13/02 |
| | | | 108/44 |
| 2019/0246791 A1* | 8/2019 | Lundberg | A47B 21/06 |
| 2022/0095784 A1* | 3/2022 | Yang | A47B 37/00 |

* cited by examiner

COMBINATION TABLE AND TABLE-ON-WHEEL STRUCTURE

BACKGROUND OF THE INVENTION

1. Technical Field

The present invention relates to combination tables and a table-on-wheel structures, and more particularly, to combination tables that are composed of and can be separated into two identical table-on-wheel structures that can each be put on a car wheel as a convenient table attached to the wheel and stands firmly on the ground, on a road or on an object surface, no matter it is a level, rough, sloping or inclined.

2. Description of Related Art

When in times of leisure activities or recreations with the driving of cars, there are always demands for a temporary desk or a table in addition to a picnic mat for placing things such as clothing, accessories, foods or drinks. Convenient attachment tables or desks, or a table-on-wheel are thus invented and came to being.

While the table-on-wheel structures used on cars nowadays are mostly just a simple attachment to a car wheel and are either lacking structure stability in use that causes objects turning over or even damaged, or being inconvenient to setup or not easy to store before or after using them. All those disadvantages generally lead to poor willingness of use, and eventually slow down the development of the relating industry.

Besides, existing table-on-wheel structures, or sometimes called tire tables, can be used only when leaning to a car wheel, while just moving around or near a car is not what happens when anyone is going for a picnic. When in the opening and far away from a car, as always is in picnicking, users still don't have a convenient table to use.

That results in the needs for an innovation of new combination tables and table-on-wheel structures that combination tables can either be used as a convenient table in the opening and stand firmly everywhere, or be separated into two identical table-on-wheel structures that can be put onto almost all kinds of car wheels at the same time and stand firmly beside a wheel, as the new innovated table-on-wheel structures do.

SUMMARY OF THE INVENTION

The present invention discloses combination tables and table-on-wheel structures. Each combination table includes two identical table-on-wheel structures connected side by side with two connection rods and stands firmly on any ground or on a surface. Each table-on-wheel structure includes a desktop frame; a stand frame; and two connection rods connected together. With the implementation of the present invention, the combination tables or the table-on-wheel structures have the special benefits of being easy to set up or operate; and being able to stand firmly on the ground, no matter it is a level ground, a rough ground or a sloping ground. Each table-on-wheel structure sets firmly upon and applies to all kinds of wheels, whether large or small, and can thus be applied to all kinds of cars. With the foot frames of the combination tables or of the table-on-wheel structures being folded at the first joints and set close to the desktop frame, convenient storage or transportations are also made possible.

The present invention provides a combination table, comprising: a first table-on-wheel structure, including a desktop frame formed with a center portion surrounded by at least a first side rod, a third side rod, a second side rod and a fourth side rod connected end to end, wherein the second side rod is in a position opposite to the first side rod and the third side rod is in a position opposite to the fourth side rod; a stand frame connects to the desktop frame with at least one first joint; and two tail rods each folded in at a second joint to lean against the second rod, wherein each of the tail rods is connected to a different end portion of the second rod with a second joint; a second table-on-wheel structure, including a desktop frame formed with a center portion surrounded by at least a first side rod, a second side rod, a third side rod and a fourth side rod connected end to end, wherein the second side rod is in a position opposite to the first side rod and the third side rod is in a position opposite to the fourth side rod; a stand frame connects to the desktop frame with at least one first joint; and two tail rods each folded in at the second joint to lean against the second rod, wherein each of the tail rods is connected to a different end portion of the second rod with a second joint; and two connection rods, fixedly connect the second table-on-wheel structure to the first table-on-wheel structure in a way that the tail rods of the first table-on-wheel structure lay next to the tail rods of the second table-on-wheel structure, wherein the stand frame of the first table-on-wheel structure together with the stand frame of the second table-on-wheel structure stand the combination table firmly on the ground.

The present invention further provides a combination table, comprising: a first table-on-wheel structure, including a desktop frame formed with a center portion surrounded by at least a first side rod, a third side rod, a second side rod and a fourth side rod connected end to end, wherein the second side rod is in a position opposite to the first side rod and the third side rod is in a position opposite to the fourth side rod; and a stand frame connects to the desktop frame with at least one first joint; a second table-on-wheel structure, including a desktop frame formed with a center portion surrounded by at least a first side rod, a third side rod, a second side rod and a fourth side rod connected end to end, wherein the second side rod is in a position opposite to the first side rod and the third side rod is in a position opposite to the fourth side rod; and a stand frame connects to the desktop frame with at least one first joint; and two connection rod, fixedly connect the second table-on-wheel structure to the first table-on-wheel structure to form the combination table in a way that the second side rod of the first table-on-wheel structure is close to the second side rod of the second table-on-wheel structure, wherein the stand frame of the first table-on-wheel structure together with the stand frame of the second table-on-wheel structure stand the combination table firmly on the ground.

The present invention further provides a table-on-wheel structure, used to set on top of a wheel of a car and stand firmly on the ground, includes: a desktop frame formed with a center portion surrounded by at least a first side rod, a third side rod, a second side rod and a fourth side rod connected end to end, wherein the second side rod is in a position opposite to the first side rod and the third side rod is in a position opposite to the fourth side rod; a stand frame connects to the desktop frame with at least one first joint; and two tail rods, each being connected to a different end portion of the second rod with a second joint.

The present invention further provides a table-on-wheel structure, used to set on top of a wheel of a car and stand firmly on the ground, includes: a desktop frame formed with a center portion surrounded by at least a first side rod, a third side rod, a second side rod and a fourth side rod connected end to end, wherein the second side rod is in a position opposite to the first side rod and the third side rod is in a position opposite to the fourth side rod; a stand frame, connects to the desktop frame with at least one first joint; and two connection rods, extend out the desktop frame near both ends of the second side rod, wherein one of the connection rod connects firmly to the third side rod and the other connection rod connects firmly to the fourth side rod.

Implementation of the present invention at least involves the following inventive steps:

1. Easy to set up or operate.
2. The combination tables stand firmly on the ground, no matter it is a level ground, a rough ground or a sloping or declined ground.
3. Combination tables can be extended in length.
4. Table-on-wheel structures can be set on the front wheel or back wheel in both sides of the car and stand firmly on the ground with each of the extendable foot post independently extendable in length.
5. The table-on-wheel structure can be applied to all kinds of car wheels, large or small, by length extendable tail rods or connection rods.
6. The stand frames of the combination tables or the table-on-wheel structure are able to be folded for convenient storage or transportations.

The features and advantages of the present invention are detailed hereinafter with reference to the preferred embodiments. The detailed description is intended to enable a person skilled in the art to gain insight into the technical contents disclosed herein and implement the present invention accordingly. In particular, a person skilled in the art can easily understand the objects and advantages of the present invention by referring to the disclosure of the specification, the claims, and the accompanying drawings.

BRIEF DESCRIPTION OF THE SEVERAL VIEWS OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE EMBODIMENTS OF THE INVENTION

Embodiments together with illustrating graphs reference are provided hereafter for further understanding and recognizing of the realization of the present invention.

Figure 1:
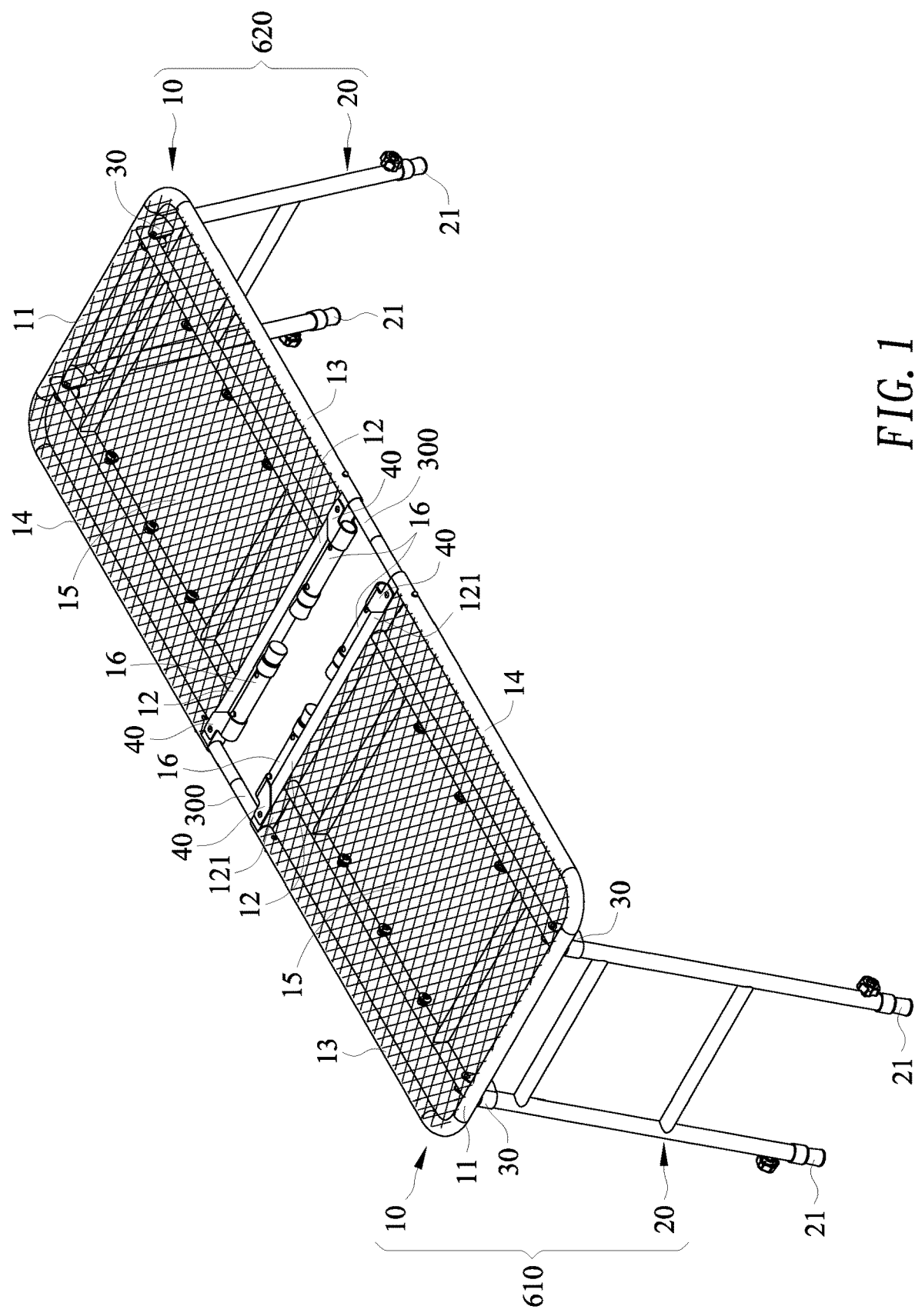
FIG. 1 is a schematic three-dimensional view of a combination table according to an embodiment of the present invention.

Please refer to FIG. 1, in an embodiment of the present invention, a combination table 600 is provided, including a first table-on-wheel structure 610, a second table-on-wheel structure 620, and two connection rods 300.

As can be seen in FIG. 1, the first table-on-wheel structure 610 includes a desktop frame 10, a stand frame 20 and two tail rods 16. The desktop frame 10, being used to put objects on, can be a light and firm board, a sturdy net body, or plural strip units. The desktop frame 10 is formed with a center portion 15 surrounded by at least a first side rod 11, a third side rod 13, a second side rod 12 and a fourth side rod 14 connected end to end, wherein the second side rod 12 is in the position opposite to the first side rod 11, and the third side rod 13 is in the position opposite to the fourth side rod 14.

As shown in FIG. 1, the second table-on-wheel structure 620 also includes a desktop frame 10, a stand frame 20 and two tail rods 16, all with the same characteristic features as that of the first table-on-wheel structure 610.

As shown in FIG. 1, the stand frame 20 connects to the desktop frame 10 nearby or on the first side rod 11 with at least one first joint 30. Said stand frame 20 can be rotated at the first joint 30 to maintain an angle with the desktop frame 10 or be folded to rest beside and be parallel to the desktop frame 10.

The forming material of each desktop frame 10 or stand frame 20 described above can be any strong and sturdy materials such as aluminum, aluminum-magnesium alloy, or other alloy. While the center portion 15 can be a board, a net, or a plate made of plastics, or woods, or same material as that of the desktop frame 10 or the stand frame 20.

Figure 2:
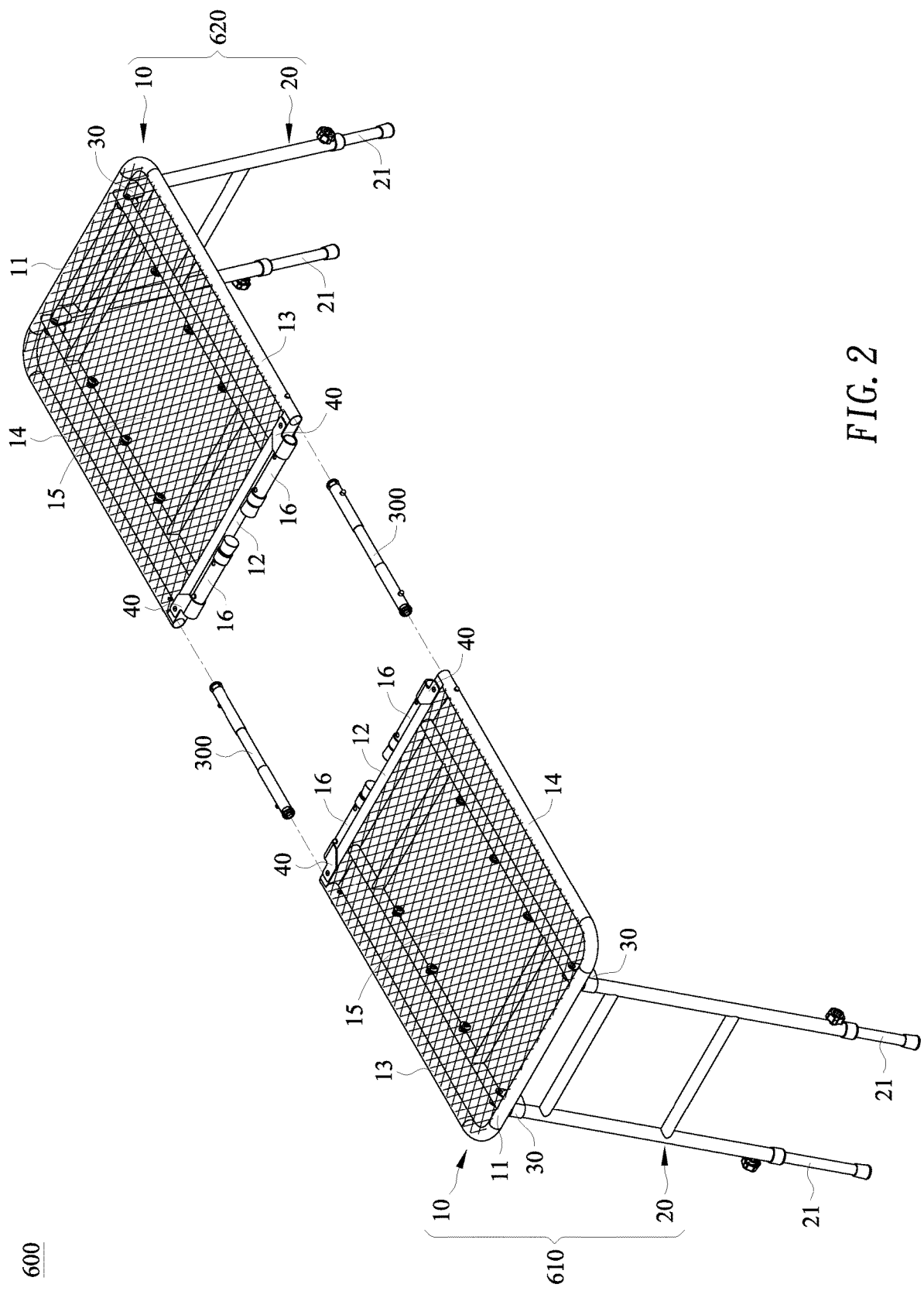
FIG. 2 is a schematic three-dimensional combination view of a combination table wherein the tail rods or the foot posts are extendable in length according to an embodiment of the present invention.

Referring to FIG. 1 and FIG. 2, each said stand frame 20 can include two foot posts 21, and each said foot post 21 is independently extendable in length, as such, the combination table 600 can stand even firmly on the ground with the stand frame 20 of the first table-on-wheel structure 610 together with the stand frame 20 of the second table-on-wheel structure 620.

That is to say, the foot posts 21 of the stand frame 20 can be extended independently, and thus the combination table 600 can stand firmly on the ground, road, or other object surface, whether flat or inclined, smooth or rough.

As shown in FIG. 1 and FIG. 2, each of the tail rods 16 of the combination table 600 is connected to a different end portion 121 of the second rod 12 with a second joint 40 and is folded in at the second joint 40 to lean against the second rod 12.

The material used for the stand frame 20, the foot posts 21 or the tail rods 16 can be light and sturdy alloy, or same material as that of the desktop frame 10.

As also shown in FIG. 1 and FIG. 2, the combination table 600 also includes two connection rods 300, fixedly connect the second table-on-wheel structure 620 to the first table-on-wheel structure 610 in such a way that the tail rods 16 of the first table-on-wheel structure 610 is close to the tail rods 16 of the second table-on-wheel structure 620, and make the first table-on-wheel structure 610 and the second table-on-wheel structure 620 together form the combination table 600, wherein the stand frame 20 of the first table-on-wheel structure 610 together with the stand frame 20 of the second table-on-wheel structure 620 support and stand the combination table 600 firmly on the ground.

As shown in FIG. 1 and FIG. 2, the connection rods 300 can be connected in a way that one connection rod 300 fixedly inserts with one end into the third side rod 13 of the first table-on-wheel structure 610 and into the fourth side rod 14 of the second table-on-wheel structure 620 with the other end, and the other connection rod 300 fixedly inserts with one end into the fourth side rod 14 of the first table-on-wheel structure 610 and into the third side rod 13 of the second table-on-wheel structure 620 with the other end.

As for the material used for the connection rods 300, it can be same material as the material for the desktop frame 10 or the stand frame 20, or can be one of other sturdy materials.

Figure 3:
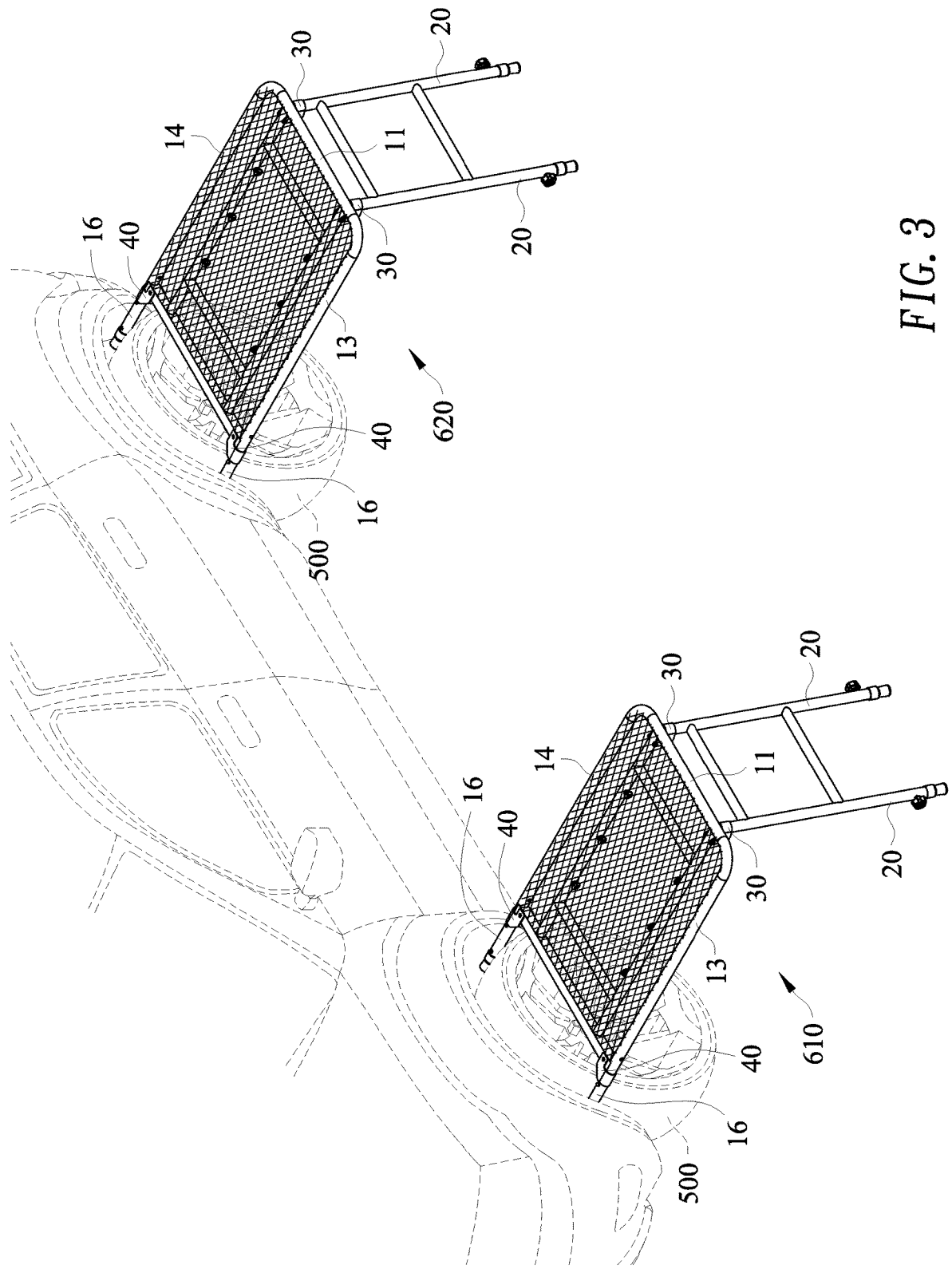
FIG. 3 is a schematic three-dimensional view of a combination table being separated into a first table-on-wheel structure and a second table-on-wheel structure that being set on top of different car wheels individually according to an embodiment of the present invention.

Please refer to FIG. 3, the combination table 600 can be disassembled into a standalone first table-on-wheel structure 610 and a standalone second table-on-wheel structure 620 by detaching the two connection rods 300, wherein the first table-on-wheel structure 610 or the second table-on-wheel structure 620 is being put on and attached firmly to a wheel 500 on a car with the two tail rods 16 rotated out at the second joint 40 from the second rod 12, and stands firmly on the ground with the stand frame 20.

Figure 4:
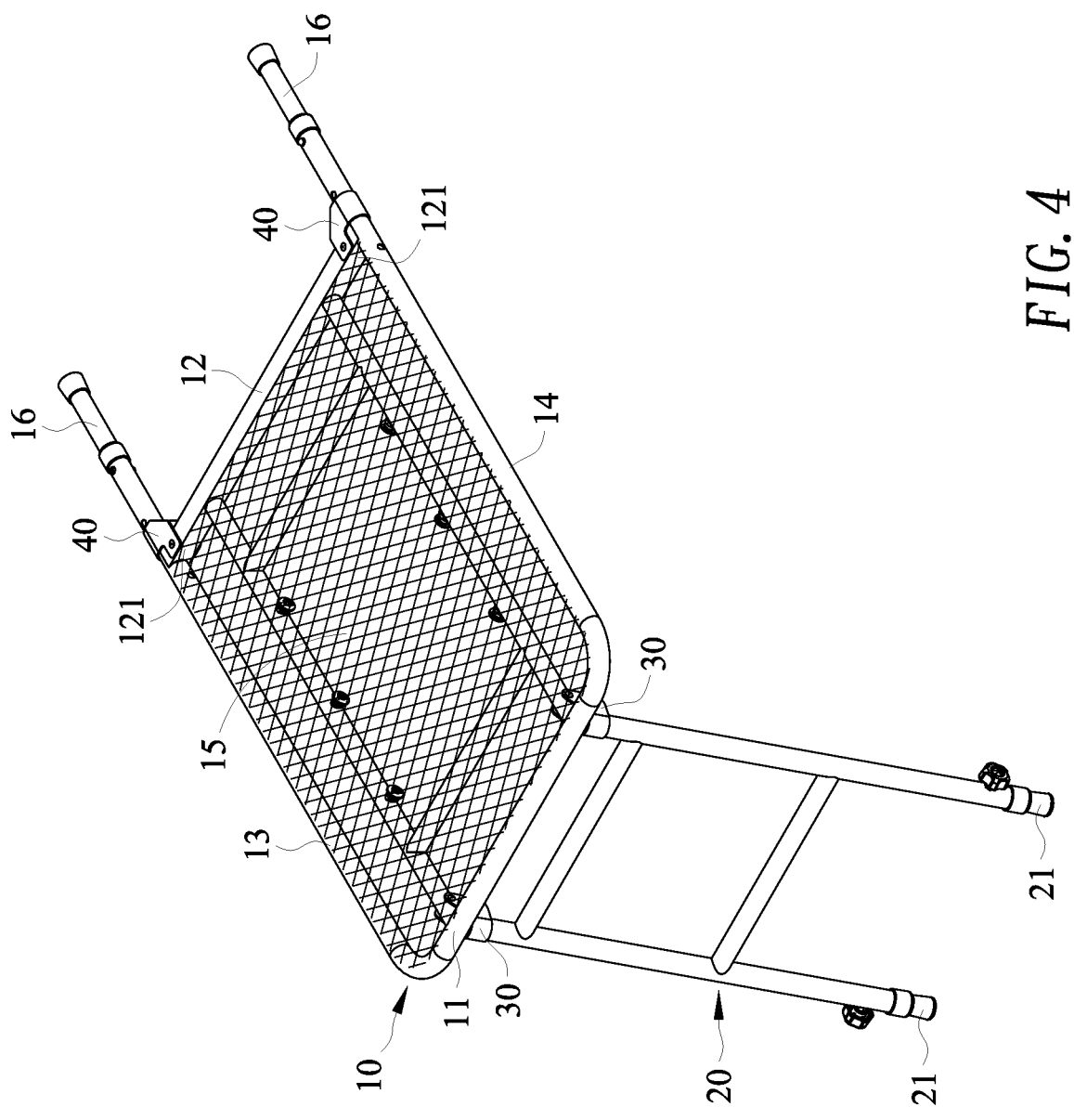
FIG. 4 is a schematic view of a first table-on-wheel structure according to an embodiment of the present invention.

As shown in FIG. 3 and FIG. 4, with the two tail rods 16 of the first table-on-wheel structure 610 or the second table-on-wheel structure 620 being extendable in length, the first table-on-wheel structure 610 or the second table-on-wheel structure 620 can be set on car wheels 500 of different sizes. Further with the length extendable foot posts 21 of the stand frame 20, the first table-on-wheel structure 610 or the second table-on-wheel structure 620 can also stand firmly on grounds or roads or object surfaces in different conditions, flat or inclined, smooth or rough.

Figure 5A:
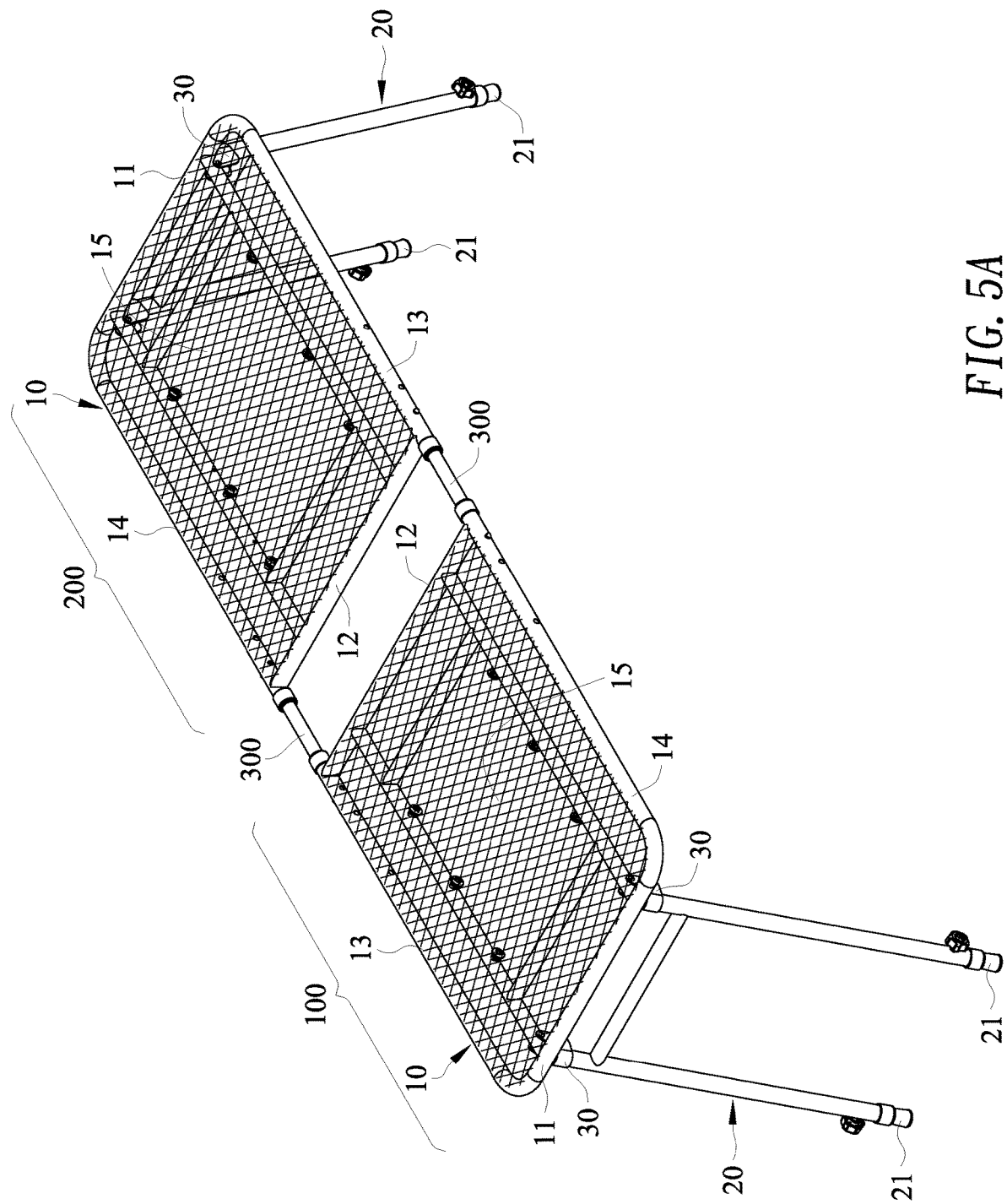
FIG. 5A is a schematic three-dimensional view of another combination table according to an embodiment of the present invention.
Figure 5B:
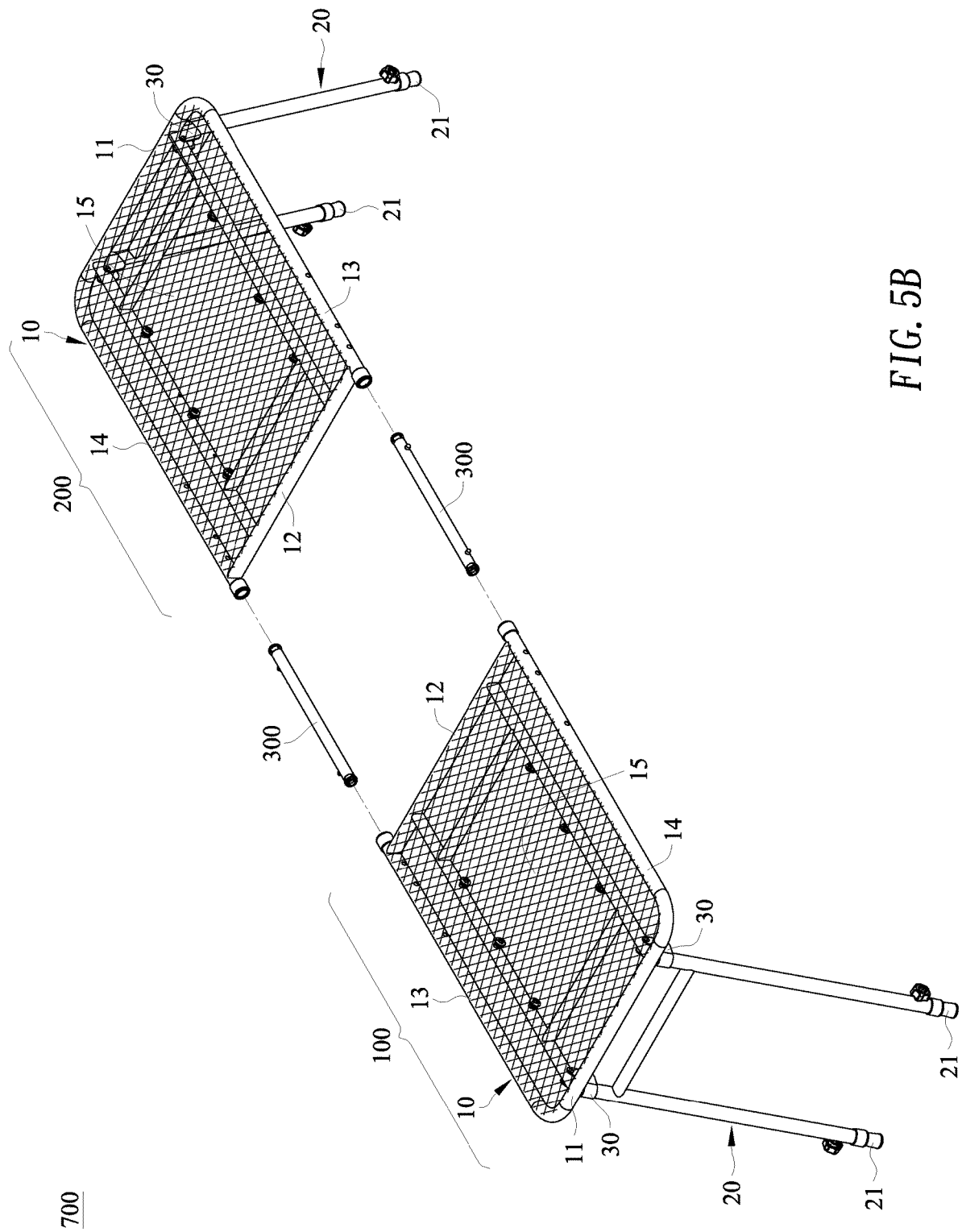
FIG. 5B is a schematic three-dimensional combinational view of the combination table according to FIG. 5A.

Please refer then to FIG. 5A and FIG. 5B, in an embodiment of the present invention, a combination table 700 is provided, including a first table-on-wheel structure 100, a second table-on-wheel structure 200, and two connection rods 300.

As can be seen in FIG. 5A and FIG. 5B, the first table-on-wheel structure 100, including a desktop frame 10 and a stand frame 20. The desktop frame 10 is formed with a center portion 15 surrounded by at least a first side rod 11, a third side rod 13, a second side rod 12 and a fourth side rod 14 connected end to end, wherein the second side rod 12 is in the position opposite to the first side rod 11, and the third side rod 13 is in the position opposite to the fourth side rod 14. While the stand frame 20 connects to the desktop frame 10 nearby or on the first side rod 11 with at least one first joint 30, and can be rotated at the first joint 30 to maintain an angle with the desktop frame 10 or be folded to rest beside and be parallel with the desktop frame 10.

As also shown in FIG. 5A and FIG. 5B, the second table-on-wheel structure 200, also includes a desktop frame 10 and a stand frame 20. The desktop frame 10 is formed with a center portion 15 surrounded by at least a first side rod 11, a third side rod 13, a second side rod 12 and a fourth side rod 14 connected end to end, wherein the second side rod 12 is in the position opposite to the first side rod 11, and the third side rod 13 is in the position opposite to the fourth side rod 14. While the stand frame 20 connects to the desktop frame 10 nearby or on the first side rod 11 with at least one first joint 30, and can be rotated at the first joint 30 to maintain an angle with the desktop frame 10 or be folded to rest beside and be parallel with the desktop frame 10.

The characteristic features of the desktop frame 10 and the stand frame 20 are same as the features described in previous paragraphs, and will not be described further here.

Referring to FIG. 5A and FIG. 5B, the combination table 700 also includes two connection rods 300, fixedly connect the second table-on-wheel structure 200 to the first table-on-wheel structure 100 in such a way that the second side rod 12 of the first table-on-wheel structure 100 is close to the second side rod 12 of the second table-on-wheel structure 200. And the stand frame 20 of the first table-on-wheel structure 100 together with the stand frame 20 of the second table-on-wheel structure 200 stand the combination table 700 firmly on the ground.

Figure 5C:
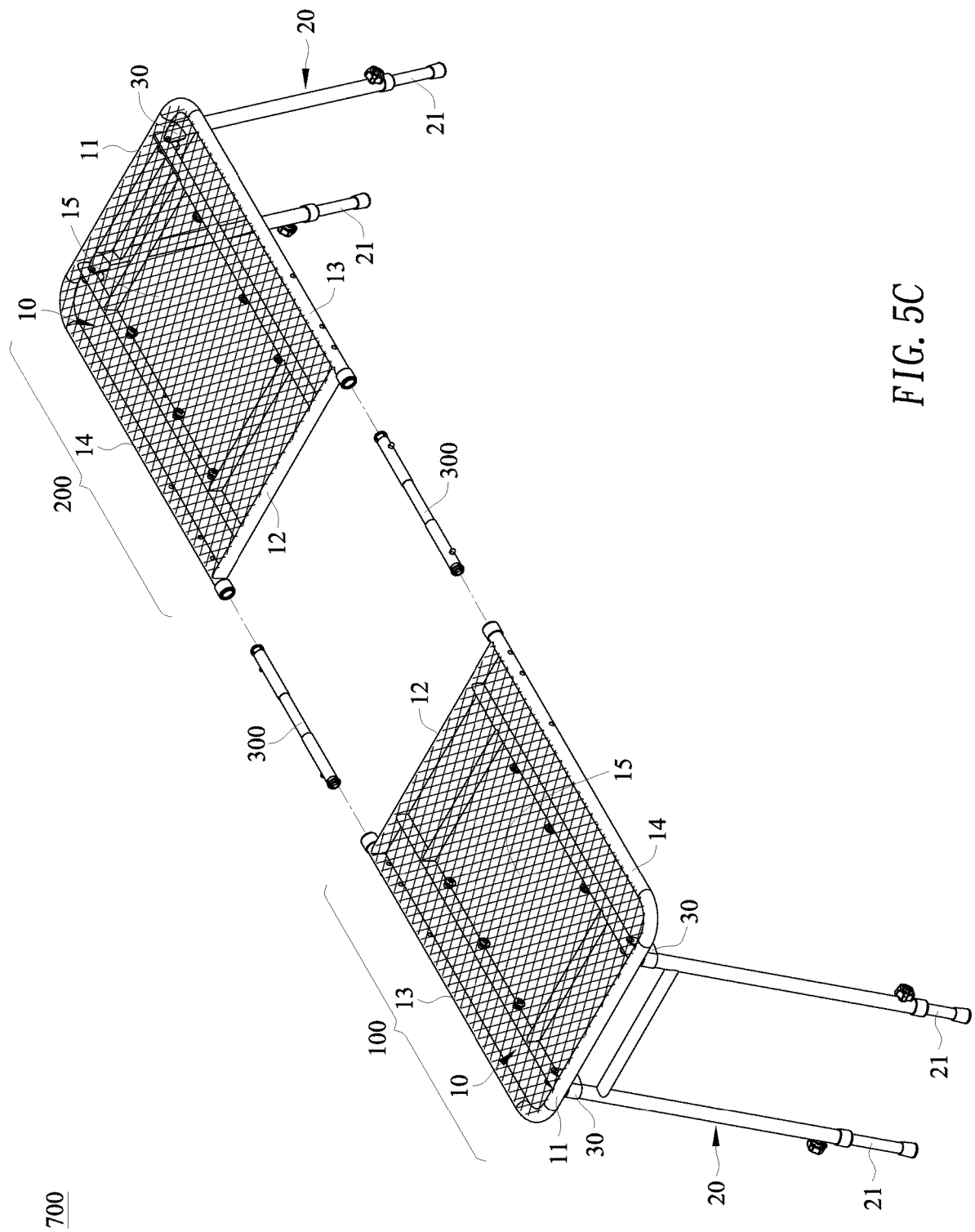
FIG. 5C is a schematic three-dimensional view of the combination table according to FIG. 5A wherein the length of the tail rods or of the foot posts is extendable.

Please refer to FIG. 5A to FIG. 5C, each said stand frame 20 can include two foot posts 21, and each said foot post 21 is independently extendable in length that the combination table 700 can stand firmly on the ground, on a road, or on an object surface, whether it is flat or inclined, smooth or rough, with the stand frame 20 of the first table-on-wheel structure 100 together with the stand frame 20 of the second table-on-wheel structure 200.

As shown in FIG. 5A to FIG. 5C, the connection rods 300 can be extendable in length, and the connection of the connection rods 300 can be in a way that one connection rod 300 fixedly inserts with one end into the third side rod 13 of the first table-on-wheel structure 100 and into the fourth side rod 14 of the second table-on-wheel structure 200 with the other end, and the other connection rod 300 fixedly inserts with one end into the fourth side rod 14 of the first table-on-wheel structure 100 and into the third side rod 13 of the second table-on-wheel structure 200 with the other end.

As for the material used for the connection rods 300, it can be same material as the material for the desktop frame 10 or the stand frame 20, or can be one of other sturdy materials.

Figure 6A:
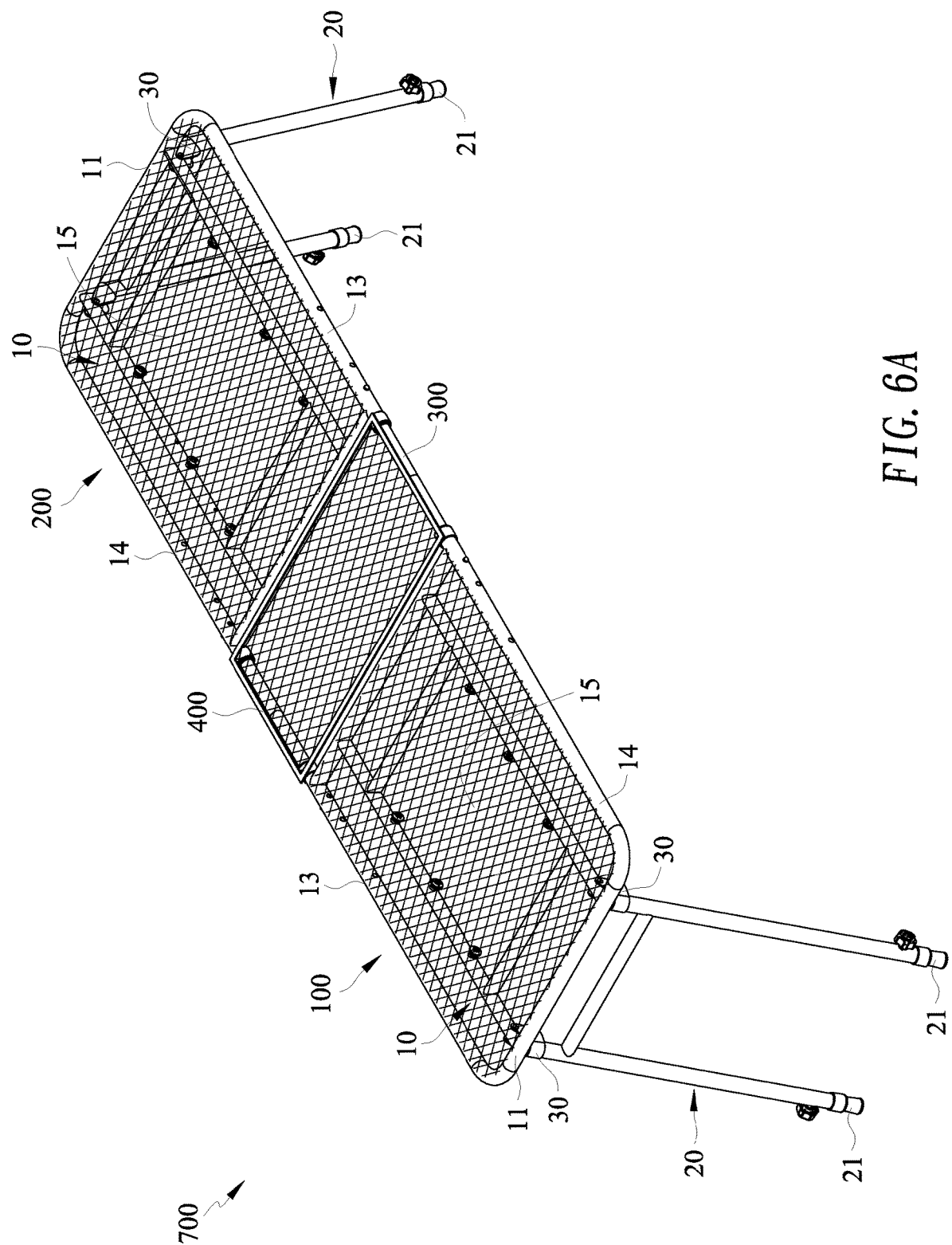
FIG. 6A is a schematic three-dimensional view of a combination table further comprises a complementary table top according to an embodiment of the present invention.
Figure 6B:
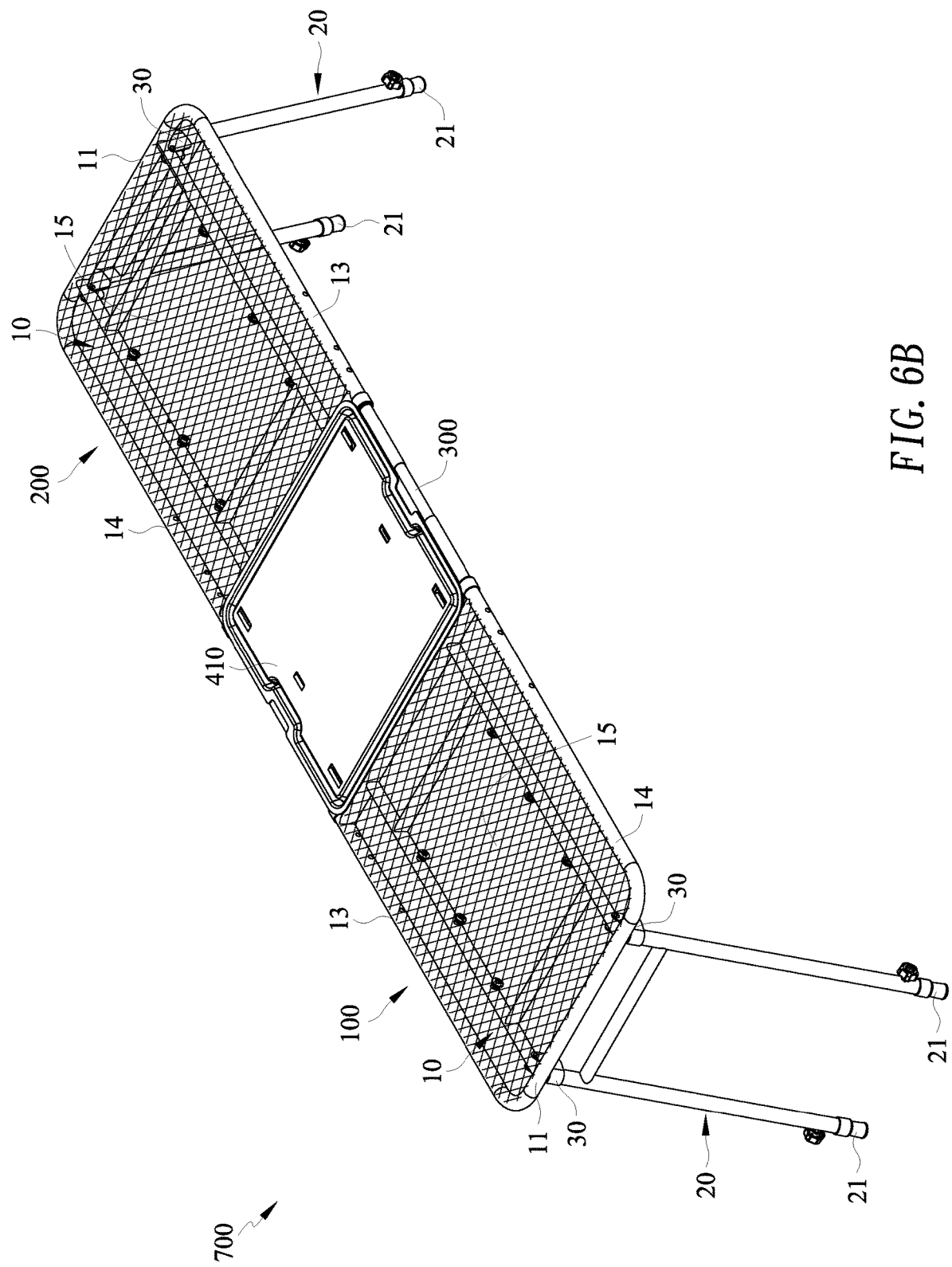
FIG. 6B is a schematic three-dimensional view of a combination table further comprises a multipurpose complementary table top set on top of the connection rods according to an embodiment of the present invention.
Figure 6C:
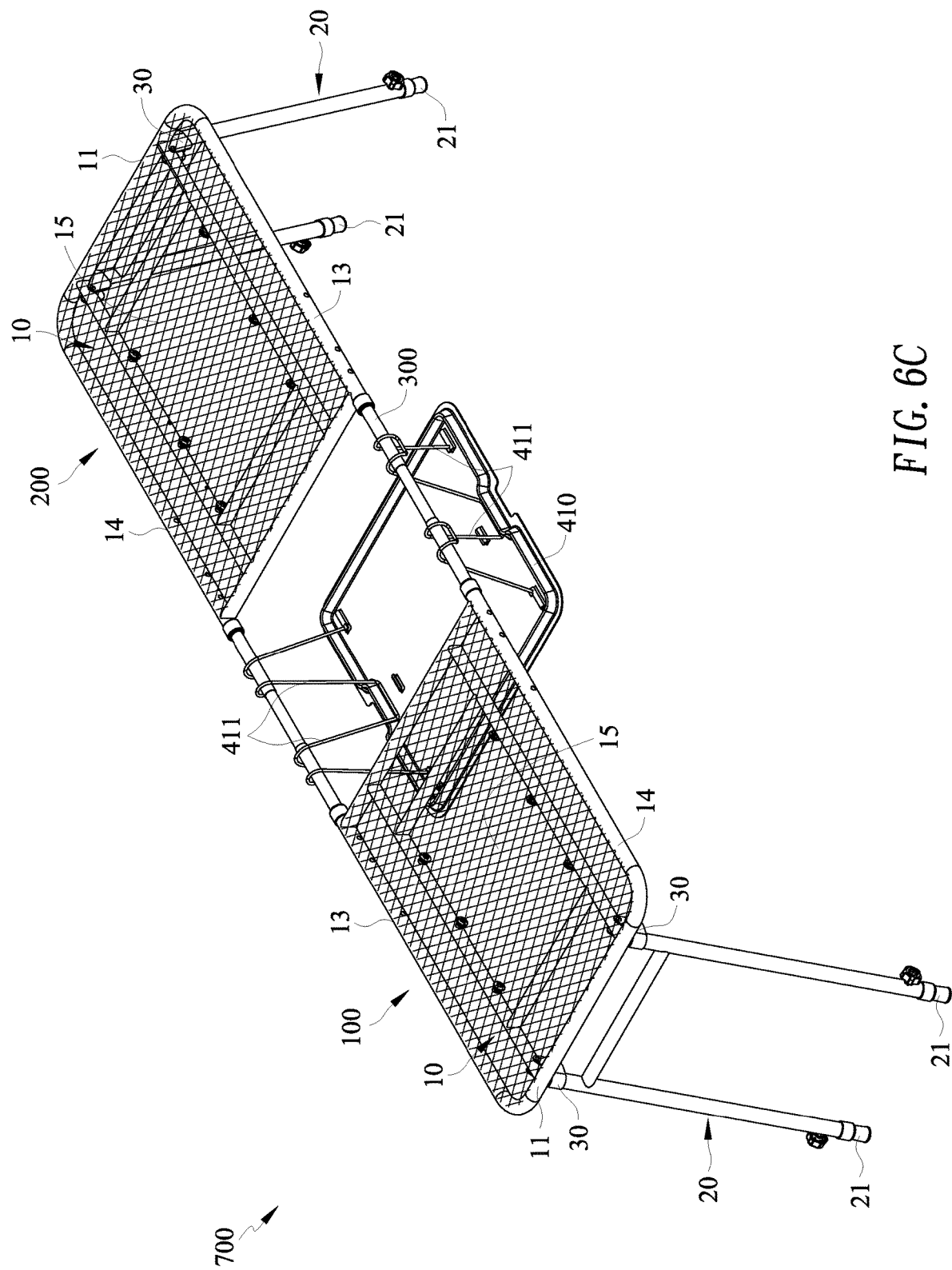
FIG. 6C is a schematic three-dimensional view of a combination table further comprises a multipurpose complementary table top hanging on the connection rods with plural hooks according to an embodiment of the present invention.

Then as shown in FIG. 6A, FIG. 6B and FIG. 6C, the combination table 700 can further comprise a complementary table top 400 or a multipurpose complementary table top 410 set on top the connection rods 300 or hanging on said connection rods 300 with two or more hooks 411. The complementary table top 400 or the multipurpose complementary table top 410 can be a wood board, a metal board, an alloy board, a rigid grid structure, or a special design for placing facilities such as portable stoves.

Figure 6D:
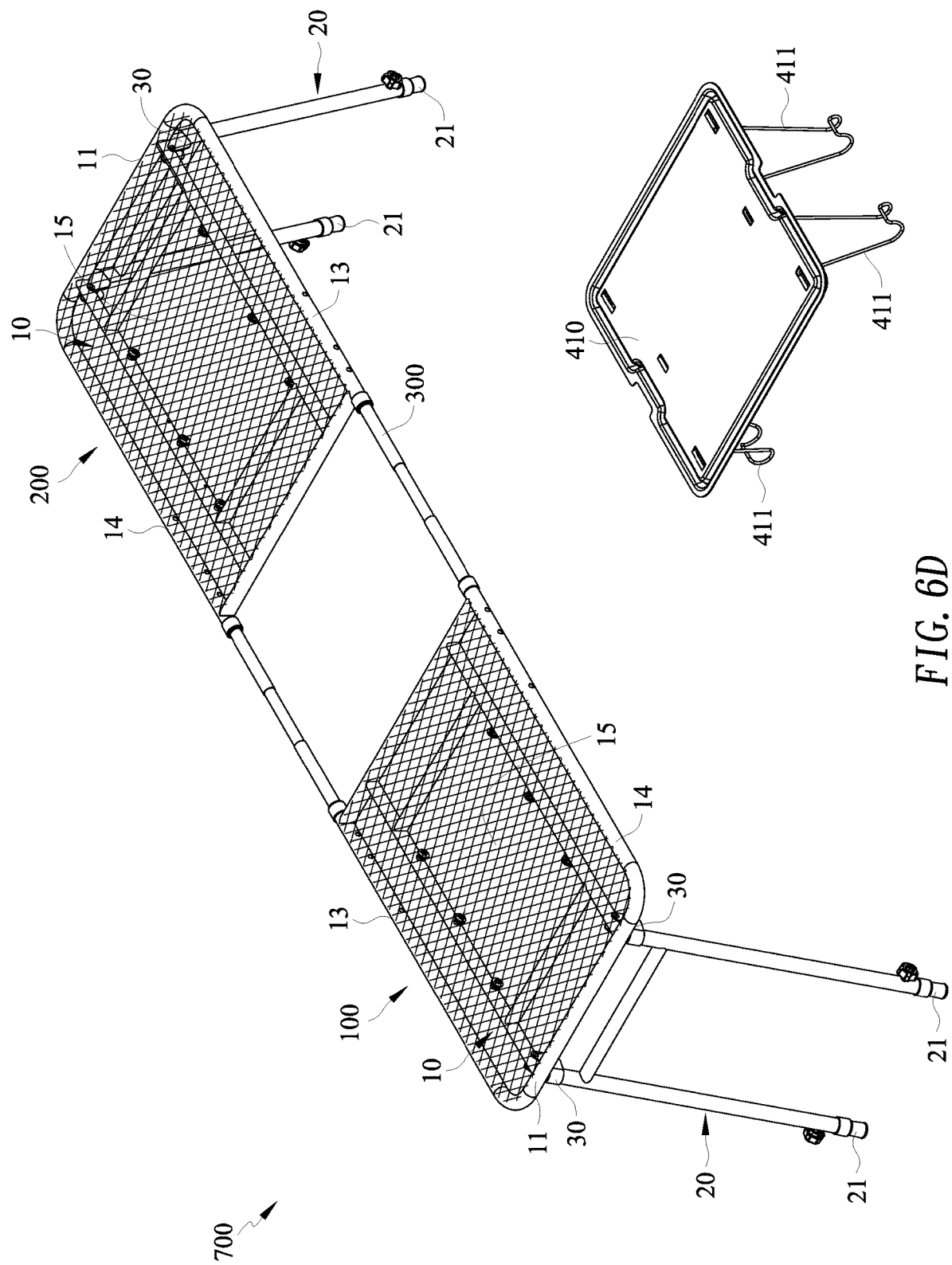
FIG. 6D is a schematic three-dimensional view of a combination table further comprises a multipurpose complementary table top standing aside the combination table according to an embodiment of the present invention.

While as shown in FIG. 6D, the multipurpose complementary table top 410 can either be put on the length adjustable connection rods 300 or hang on said connection rods 300 with two or more hooks 411, or even stand beside the combination table 700 with the attached hooks 411 for proper usage.

Figure 7:
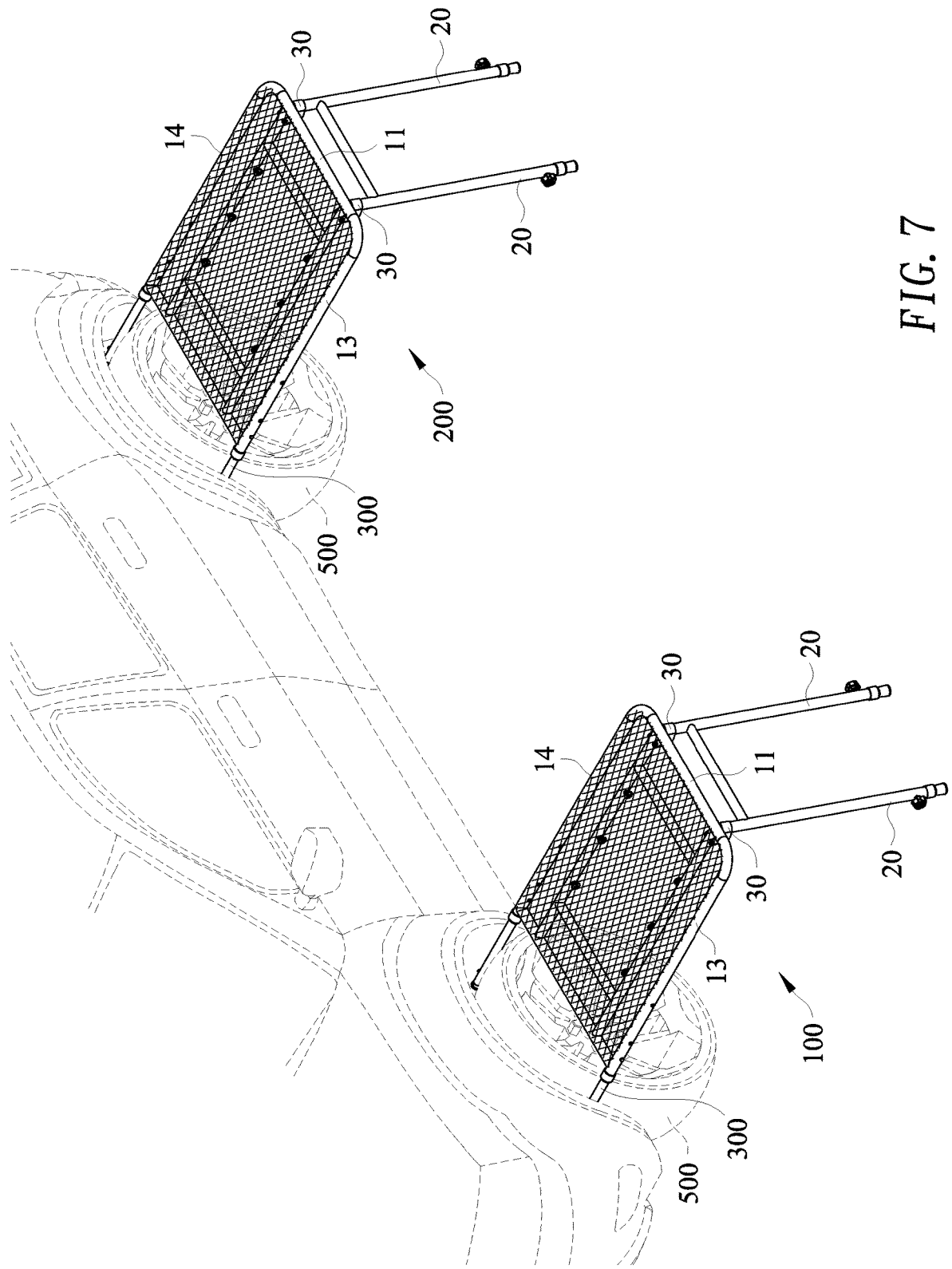
FIG. 7 is a schematic three-dimensional view of another combination table being separated into a first table-on-wheel structure and a second table-on-wheel structure that being set on top of different car wheels individually according to an embodiment of the present invention.

Please refer to FIG. 7, The combination table 700 can be disassembled into a standalone first table-on-wheel structure 100 and a standalone second table-on-wheel structure 200 by detaching the two connection rods 300, and either can be put on and attached firmly to a wheel 500 of a car with two said connection rods 300, and stands firmly on the ground with the stand frame 20 in a way that one connection rod 300 is placed on the wheel 500 with one end connected tight to the third side rod 13, the other connection rod 300 is placed on the wheel 500 with one end connected tight to the fourth side rod 14.

Figure 8:
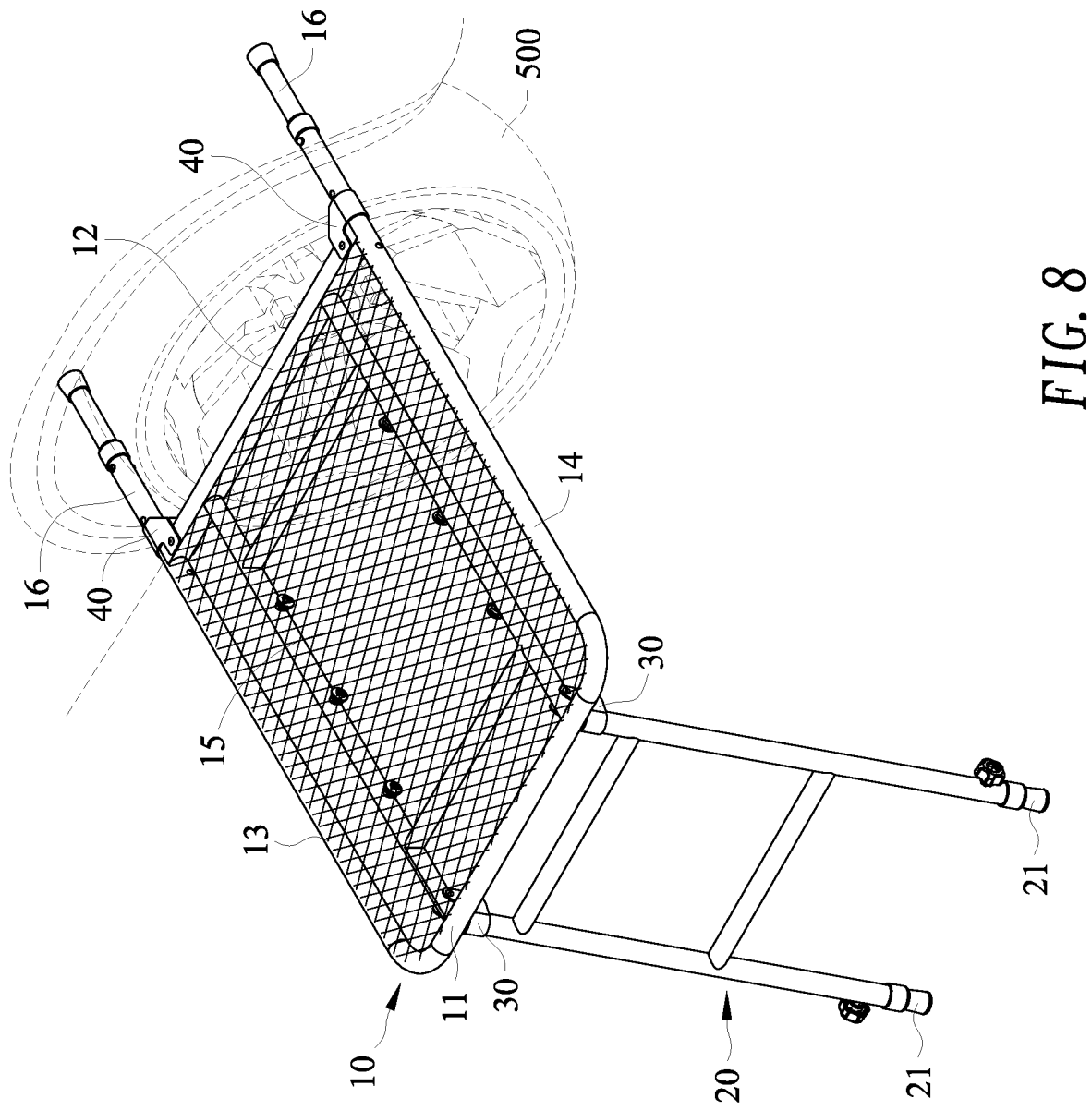
FIG. 8 is a schematic three-dimensional view of a table-on-wheel structure according to an embodiment of the present invention.
Figure 9A:
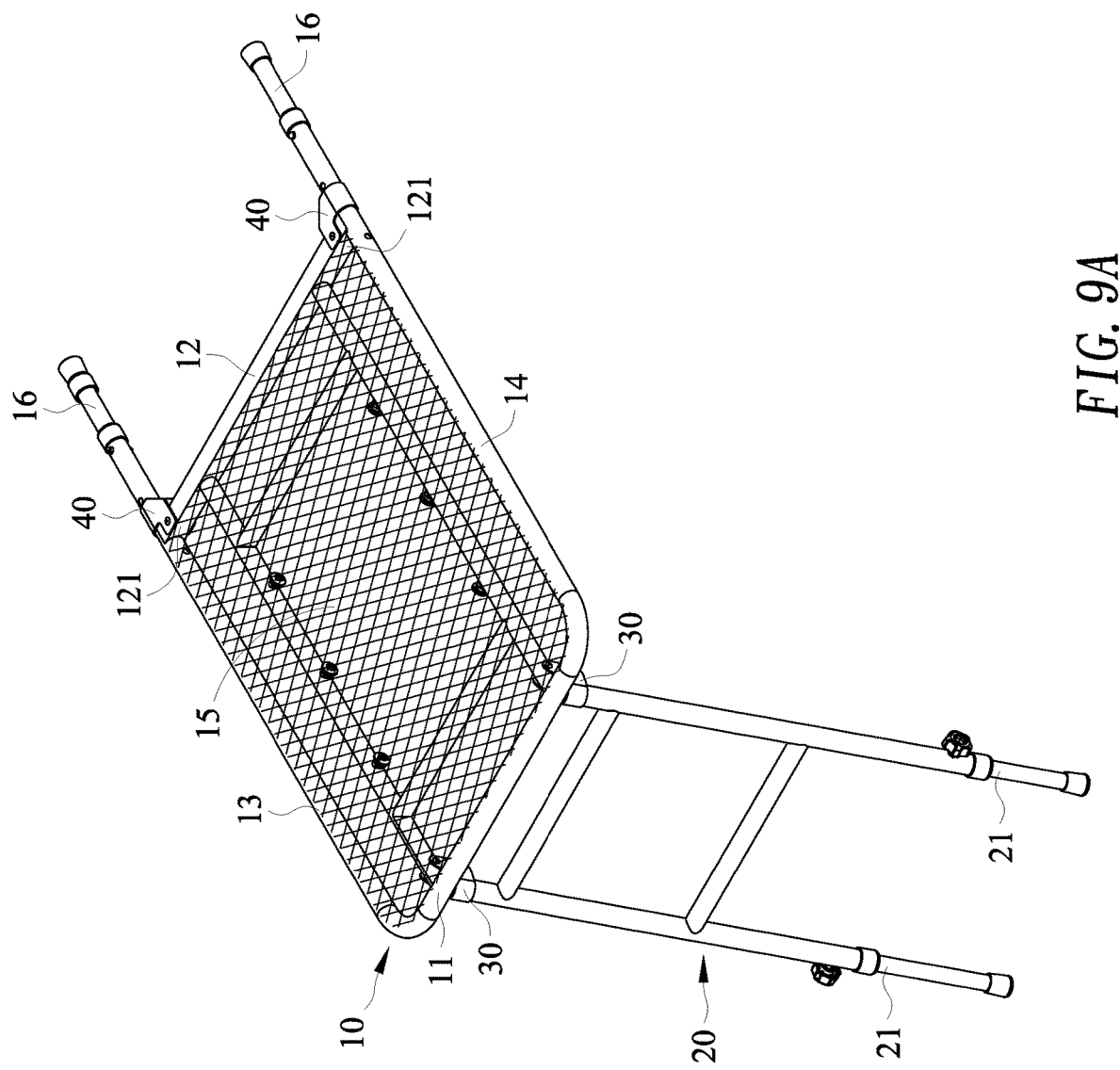
FIG. 9A is a schematic three-dimensional view of a table-on-wheel structure with the foot post of the stand frame being extendable in length according to an embodiment of the present invention.
Figure 9B:
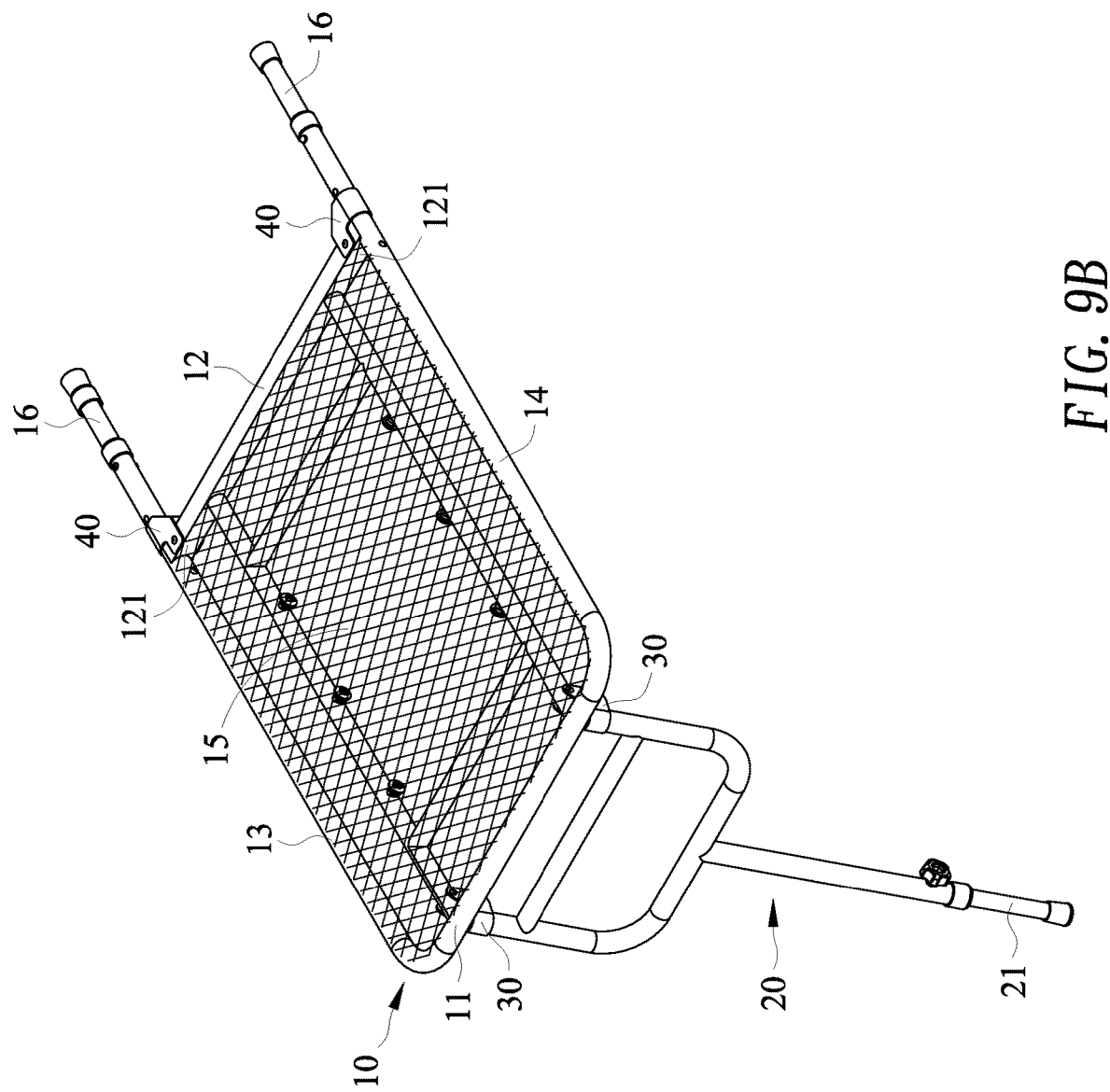
FIG. 9B is a schematic three-dimensional view of another table-on-wheel structure with the foot post of the stand frame being extendable in length according to an embodiment of the present invention.
Figure 9C:
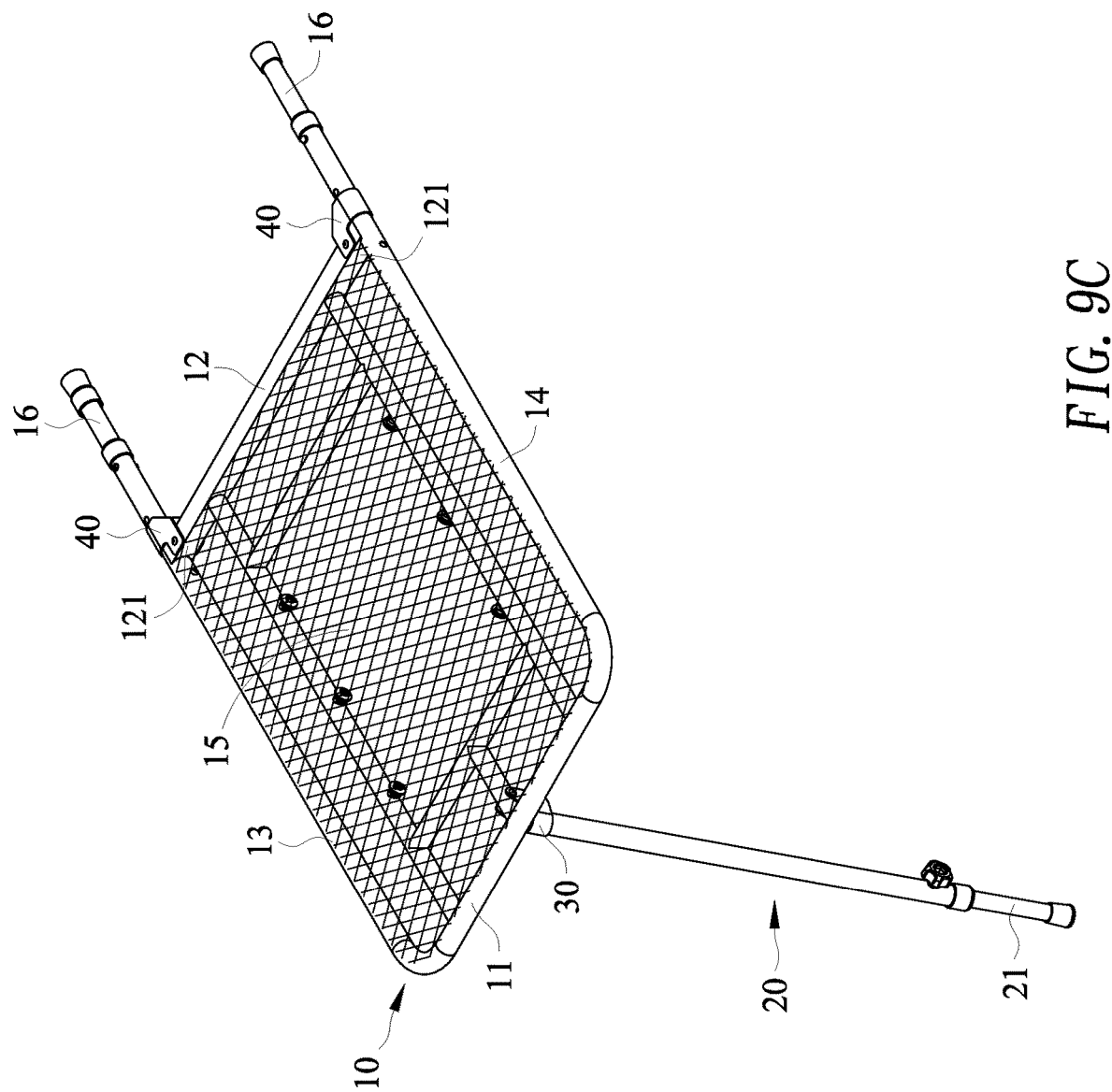
FIG. 9C is a schematic three-dimensional view of still another table-on-wheel structure with the foot post of the stand frame being extendable in length according to an embodiment of the present invention.

Please refer then to FIG. 8, is an embodiment of a table-on-wheel structure 800, used to set on top of a wheel 500 of a car and stand firmly on the ground, includes a desktop frame 10, a stand frame 20, and two tail rods 16.

As shown in FIG. 8, the desktop frame 10 is formed with a center portion 15 surrounded by at least a first side rod 11, a third side rod 13, a second side rod 12 and a fourth side rod 14 connected end to end, wherein the second side rod 12 is in a position opposite to the first side rod 11 and the third side rod 13 is in a position opposite to the fourth side rod 14.

As shown in FIG. 8 and FIG. 9A to FIG. 9C, the stand frame 20 connects to the desktop frame 10 with at least one first joint 30 and can include at least on foot post 21, wherein one foot post 21 can be extended in length to make the table-on-wheel structure 800 stand firmly even on inclined or rough roads, ground, or object surfaces.

As also shown in FIG. 8, the tail rods 16, each being connected to a different end portion 121 of the second rod 12 with a second joint 40, is also extendable in length. With the two tail rods 16 being extendable in length, the table-on-wheel structure 800 can be set on a car wheel 500 of different sizes. Further with the length extendable foot post 21 of the stand frame 20, the table-on-wheel structure 800 can also stand firmly on grounds or roads or object surfaces in different conditions, flat or inclined, smooth or rough.

Figure 10:
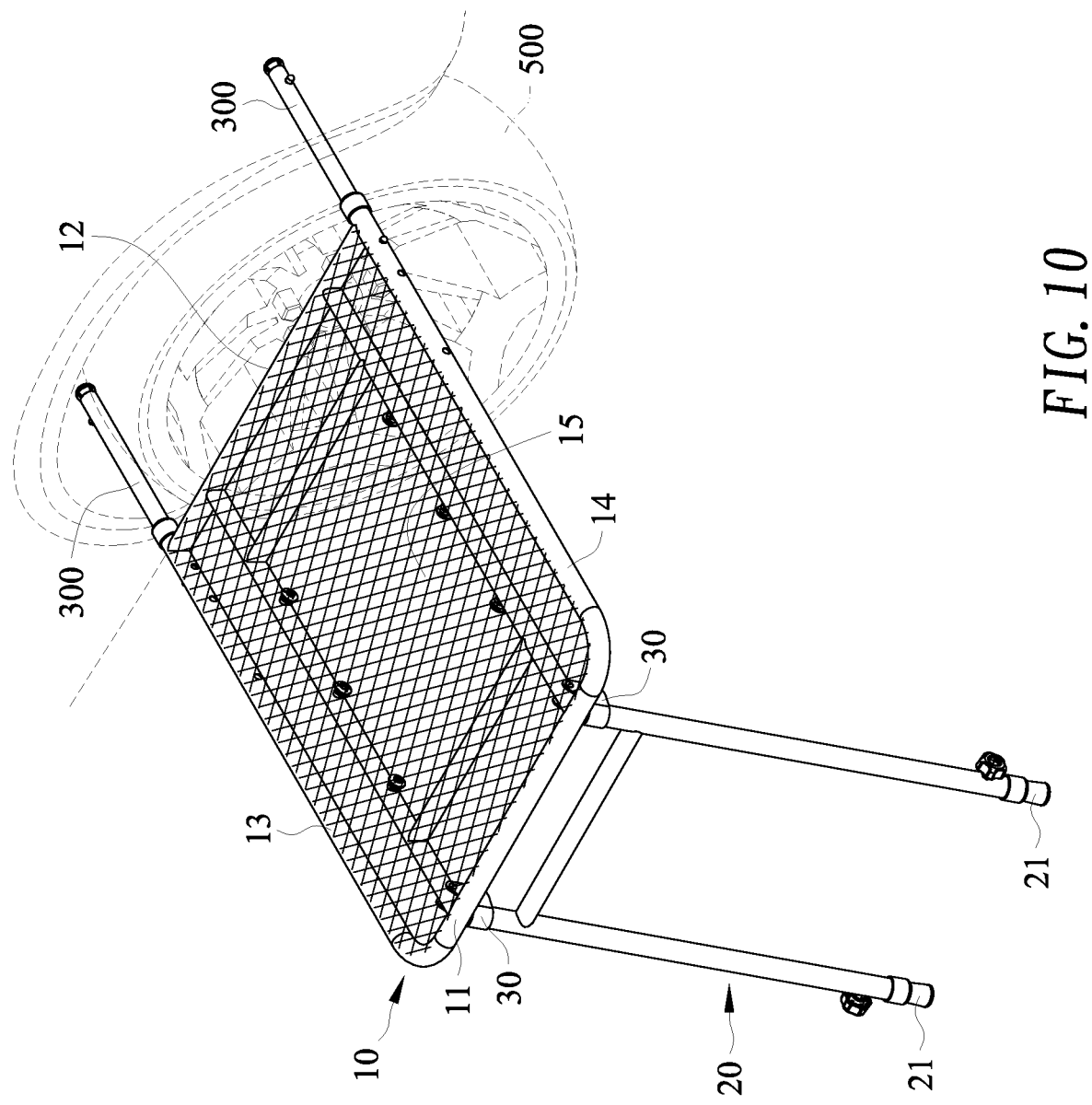
FIG. 10 is a schematic three-dimensional view of another table-on-wheel structure according to an embodiment of the present invention.
Figure 11A:
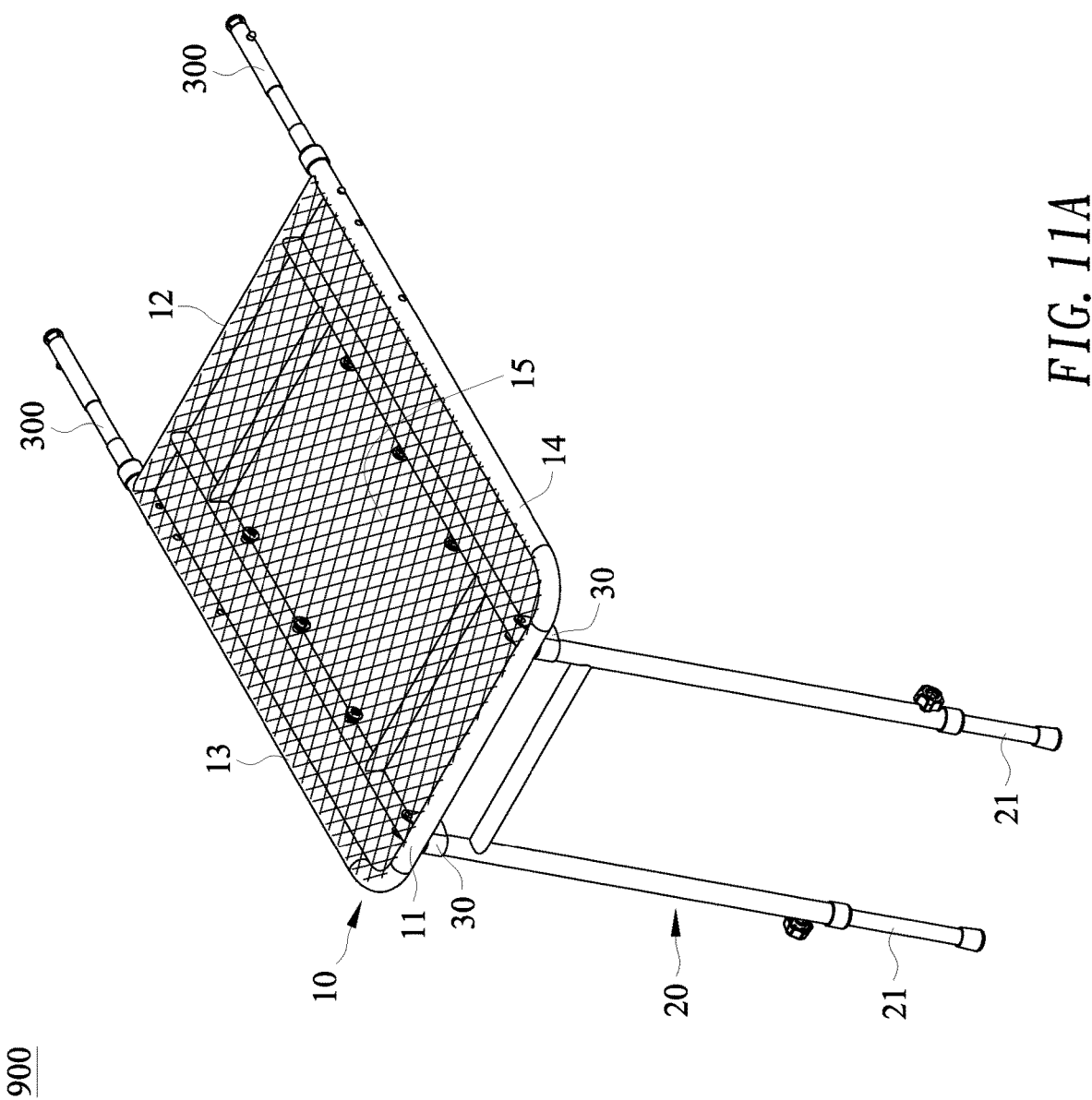
FIG. 11A is a schematic three-dimensional view of another table-on-wheel structure with the foot post of the stand frame being extendable in length according to an embodiment of the present invention.
Figure 11B:
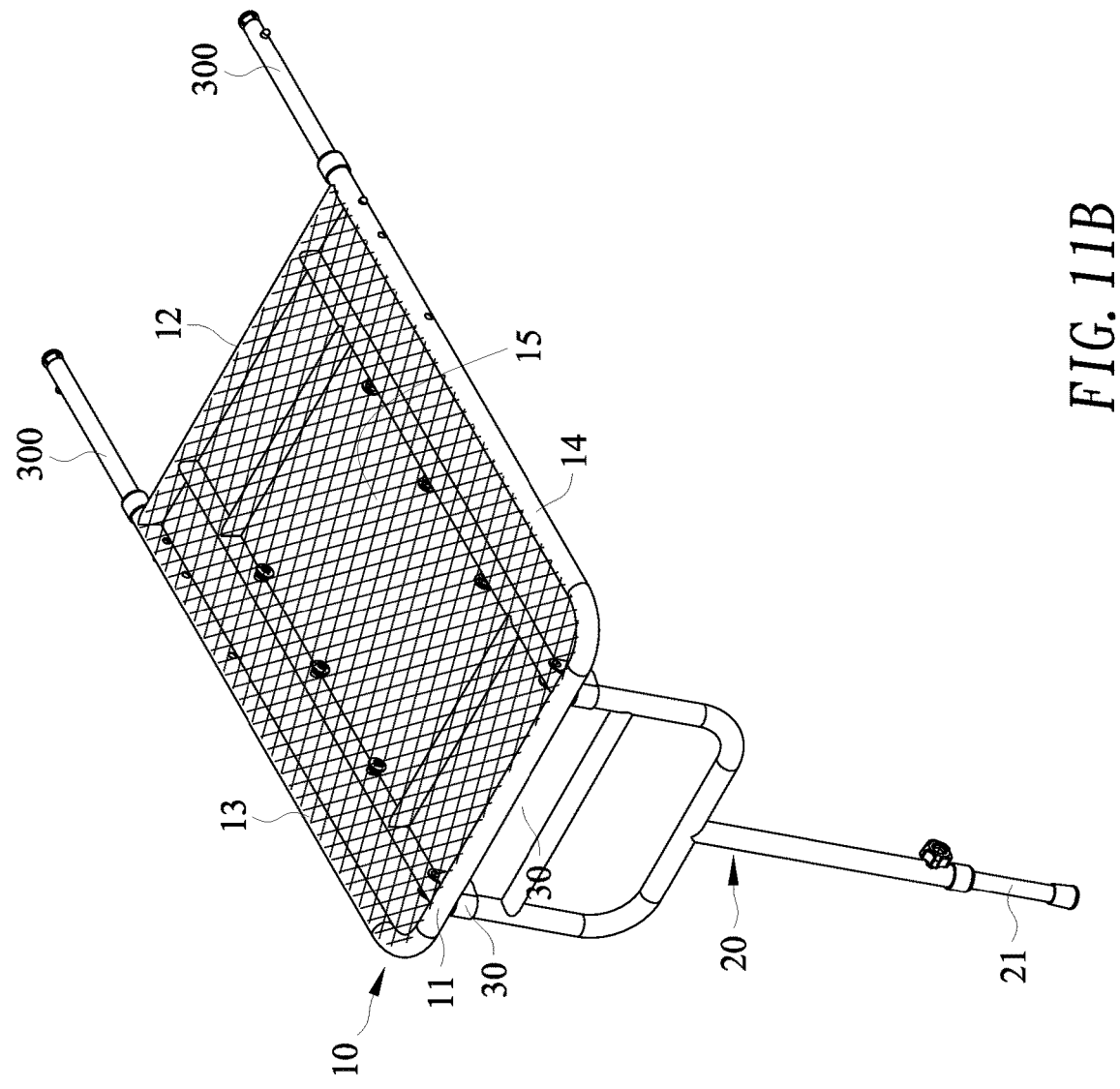
FIG. 11B is a schematic three-dimensional view of another table-on-wheel structure with the foot post of the stand frame being extendable in length according to an embodiment of the present invention.
Figure 11C:
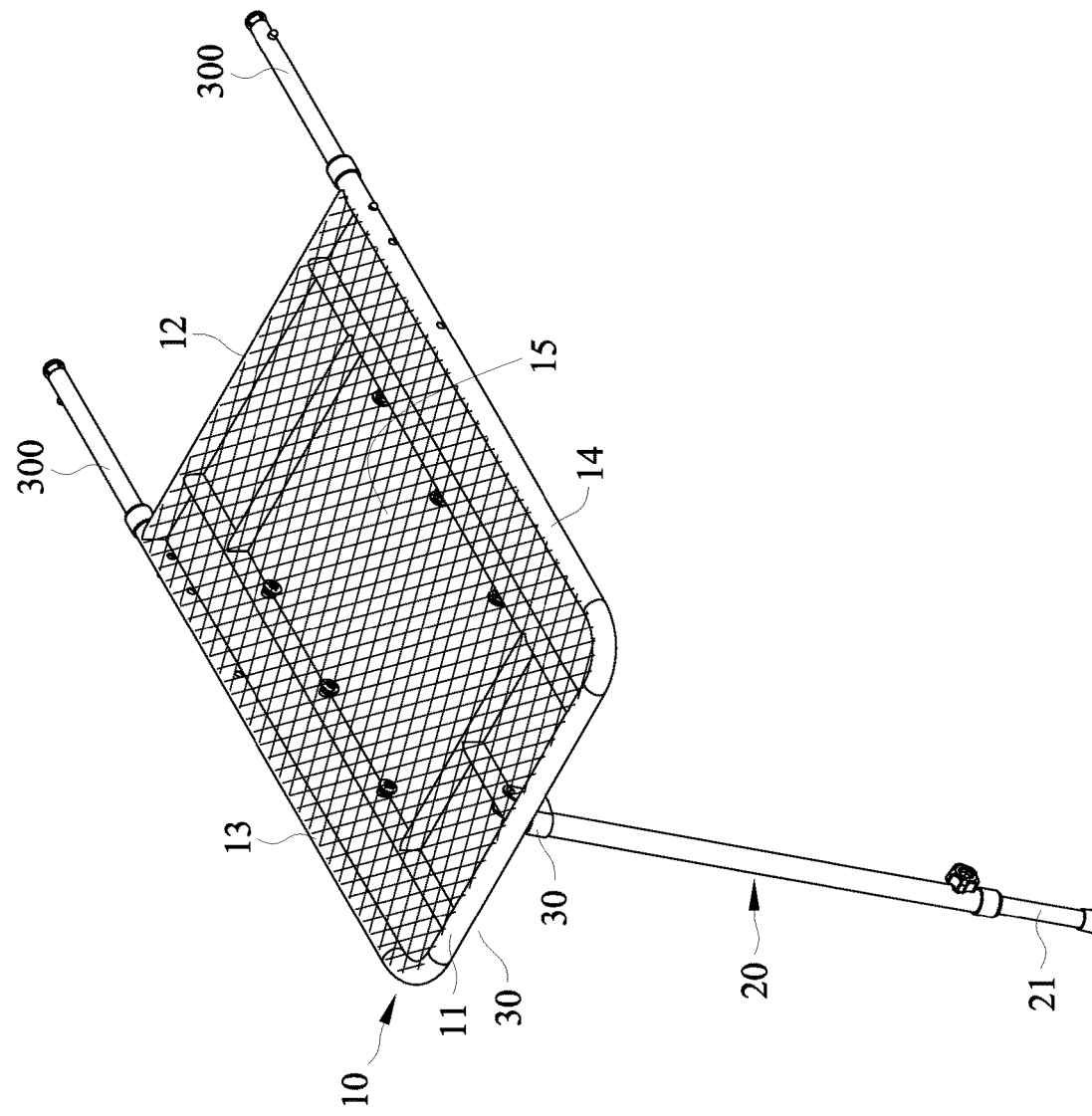
FIG. 11C is a schematic three-dimensional view of another table-on-wheel structure with the foot post of the stand frame being extendable in length according to an embodiment of the present invention.

Please refer then to FIG. 10, is an embodiment of a table-on-wheel structure 900, used to set on top of a wheel 500 of a car and stand firmly on the ground, includes a desktop frame 10, a stand frame 20, and two connection rods 300.

As shown in FIG. 8, FIG. 9A to FIG. 9C, FIG. 10, and FIG. 11A to FIG. 11C, the characteristic features of the desktop frame 10, the stand frame 20, and the foot extendable post 21 of the stand frame 20 in table-on-wheel structure 900 are same as those of the table-on-wheel structure 800, and will not be described again.

As shown in FIG. 10, each said connection rod 300 is extendable in length and extends out the desktop frame 10 with one connection rod 300 connected to the third side rod 13 and the other connection rod 300 connected to the fourth side rod 14.

As shown in FIG. 10 and FIG. 11A to FIG. 11C, with the two connection rods 300 being extendable in length, the table-on-wheel structure 900 can be set on a car wheel 500 of different sizes. Further with the length extendable foot post 21 of the stand frame 20, the table-on-wheel structure 900 can also stand firmly on grounds or roads or object surfaces in different conditions, flat or inclined, smooth or rough, and stay horizontally flat for applications.

As for the forming material of the desktop frame 10, the stand frame 20, the foot post 21, the tail rods 16 or the connection rods 300, aluminum, aluminum-magnesium alloy, other alloy, or other light and sturdy materials can be used.

Figure 12A:
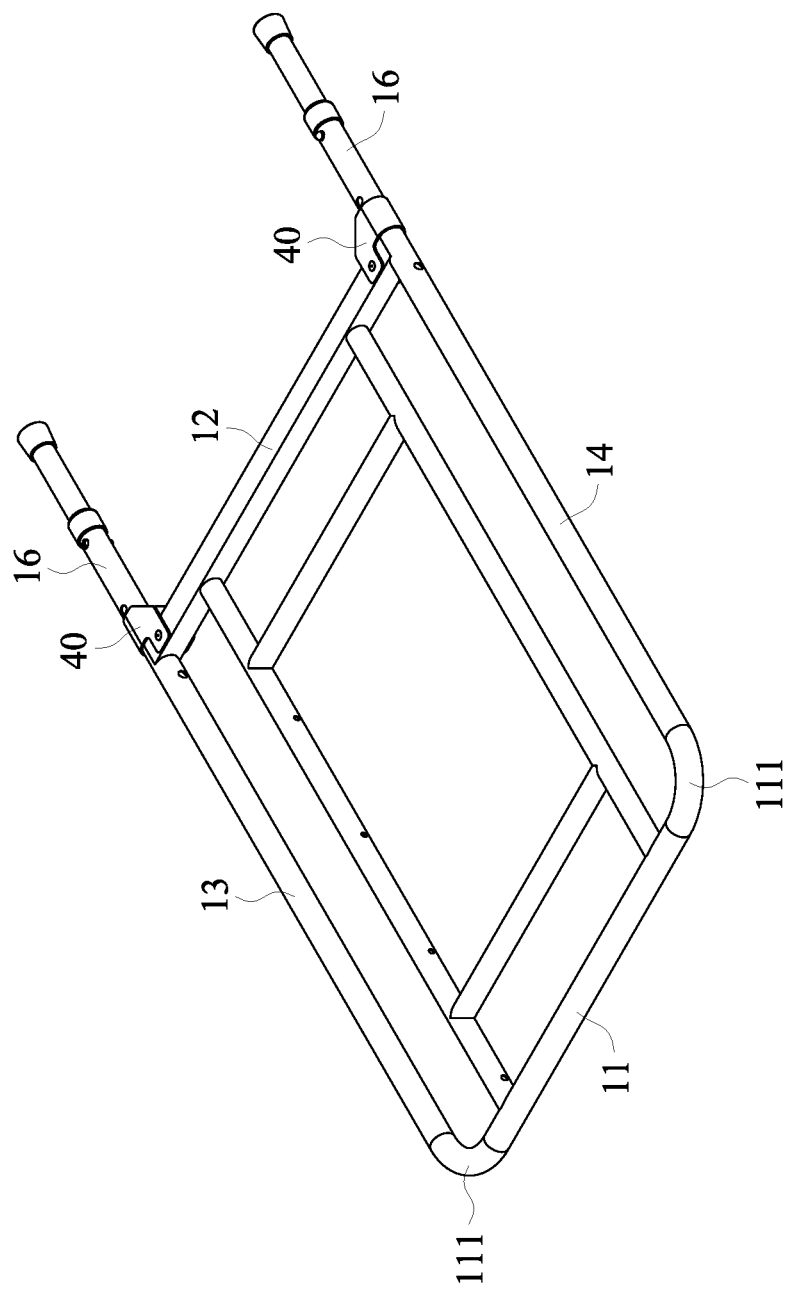
FIG. 12A is a schematic view of a combination table with the first side rod being bended at both ends according to an embodiment of the present invention.
Figure 12B:
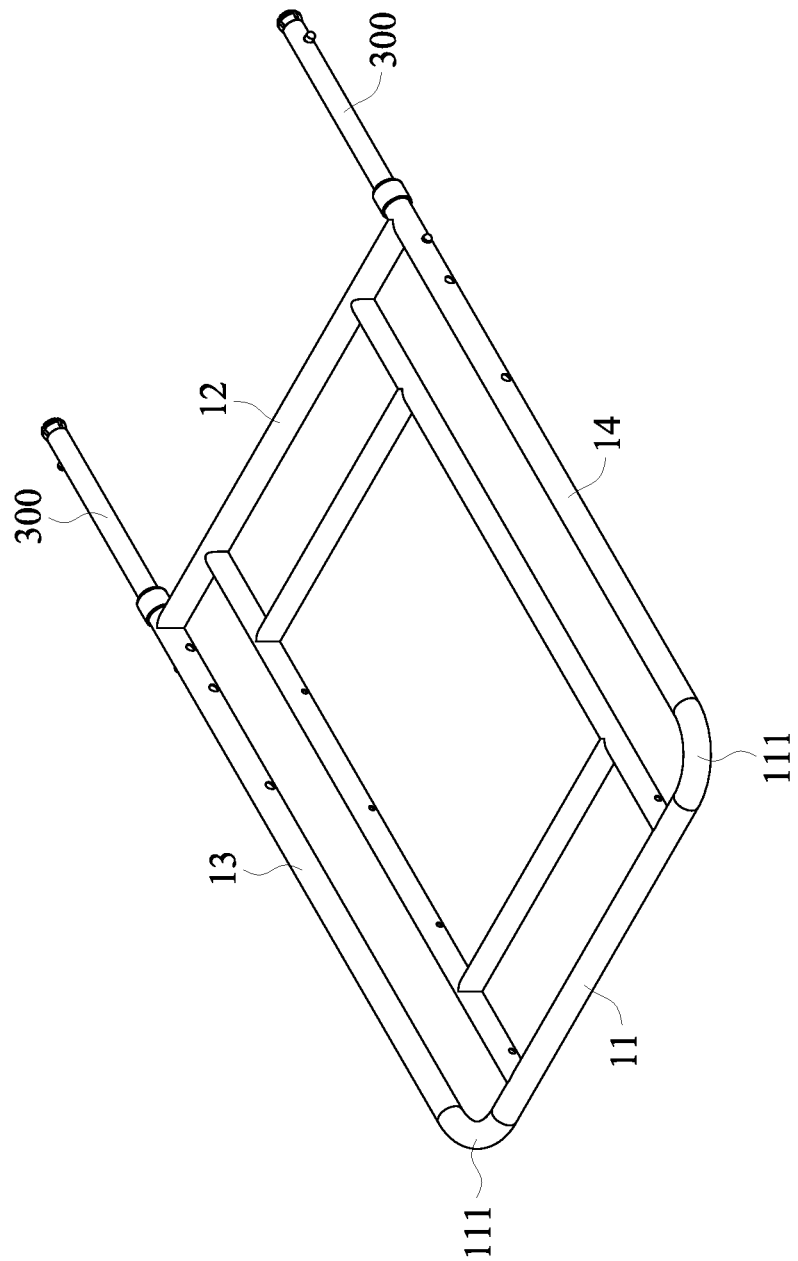
FIG. 12B is a schematic view of another combination table with the first side rod being bended at both ends according to an embodiment of the present invention.

Then as shown in FIG. 12A and FIG. 12B, the first side rod 11 can be bended at its both ends 111 toward the third side rod 13 and fourth side rod 14 respectively and forms a U shape together with the corresponding third side rod 13 and fourth side rod 14 with the first side rod 11 being the middle portion of the U shape. As such, usage of the combination table 600, the combination table 700, the table-on-wheel structure 800 or the table-on-wheel structure 900 will be even safer.

In conclusion, multiple improvements that cannot be achieved by known existing solutions or structures, can be achieved by the combination table 600, the combination table 700, the table-on-wheel structure 800 or the table-on-wheel structure 900 of the present invention. The most important two of them are: firstly, a convenient combination table 600 or combination table 700 that can be separated into two table-on-wheel structures to attach to two car wheels 500 at the same time and stand firmly on grounds of different conditions; and secondly, the table-on-wheel structures (610, 620, 100, 200, 800, and 900) are applicable to car wheels 500 of different sizes or heights.

The embodiments described above are intended only to demonstrate the technical concept and features of the present invention to enable a person skilled in the art to understand and implement the contents disclosed herein. It is understood that the disclosed embodiments are not to limit the scope of the present invention. Therefore, all equivalent changes or modifications based on the concept of the present invention should be encompassed by the appended claims.

What is claimed is:

1. A combination table (600), comprising:

a first table-on-wheel structure (610), including a desktop frame (10) formed with a center portion (15) surrounded by at least a first side rod (11), a third side rod (13), a second side rod (12) and a fourth side rod (14) connected end to end, wherein the second side rod (12) is in a position opposite to the first side rod (11) and the third side rod (13) is in a position opposite to the fourth side rod (14); a stand frame (20) connects to the desktop frame (10) with at least one first joint (30); and two tail rods (16) each folded in at a second joint (40) to lean against the second rod (12), wherein each of the tail rods (16) is connected to a different end portion (121) of the second rod (12) with a second joint (40);

a second table-on-wheel structure (620), including a desktop frame (10) formed with a center portion (15) surrounded by at least a first side rod (11), a second side rod (12), a third side rod (13) and a fourth side rod (14) connected end to end, wherein the second side rod (12) is in a position opposite to the first side rod (11) and the third side rod (13) is in a position opposite to the fourth side rod (14); a stand frame (20) connects to the desktop frame (10) with at least one first joint (30); and two tail rods (16) each folded in at the second joint (40) to lean against the second rod (12), wherein each of the tail rods (16) is connected to a different end portion (121) of the second rod (12) with a second joint (40); and two connection rods (300), fixedly connect the second table-on-wheel structure (200) to the first table-on-wheel structure (610) in a way that the tail rods (16) of the first table-on-wheel structure (610) lay next to the tail rods (16) of the second table-on-wheel structure (620), wherein the stand frame (20) of the first table-on-wheel structure (610) together with the stand frame (20) of the second table-on-wheel structure (620) stand the combination table (600) firmly on the ground.

2. The combination table (600) according to claim 1, wherein each said stand frame (20) includes two foot posts (21).

3. The combination table (600) according to claim 2, wherein each said foot post (21) is independently extendable in length.

4. The combination table (600) according to claim 1, wherein said tail rods (16) are extendable in length.

5. The combination table (600) according to claim 1, wherein one connection rod (300) fixedly connects with one end to the third side rod (13) of the first table-on-wheel structure (610) and fixedly connects with the other end to the fourth side rod (14) of the second table-on-wheel structure (620), and wherein the other connection rod (300) fixedly connects with one end to the fourth side rod (14) of the first table-on-wheel structure (610) and fixedly connects with the other end to the third side rod (13) of the second table-on-wheel structure (620).

6. The combination table (600) according to claim 1, is being disassembled into a standalone first table-on-wheel structure (610) and a standalone second table-on-wheel structure (620) by detaching the two connection rods (300), wherein the first table-on-wheel structure (610) or the second table-on-wheel structure (620) is being put on and attached firmly to a wheel (500) on a car with the two tail rods (16) rotated out at the second joint (40) from the second rod (12), and stands firmly on the ground with the stand frame (20).

7. A combination table (700), comprising:

a first table-on-wheel structure (100), including a desktop frame (10) formed with a center portion (15) surrounded by at least a first side rod (11), a third side rod (13), a second side rod (12) and a fourth side rod (14) connected end to end, wherein the second side rod (12) is in a position opposite to the first side rod (11) and the third side rod (13) is in a position opposite to the fourth side rod (14); and a stand frame (20) connects to the desktop frame (10) with at least one first joint (30);

a second table-on-wheel structure (200), including a desktop frame (10) formed with a center portion (15) surrounded by at least a first side rod (11), a third side rod (13), a second side rod (12) and a fourth side rod (14) connected end to end, wherein the second side rod (12) is in a position opposite to the first side rod (11) and the third side rod (13) is in a position opposite to the fourth side rod (14); and a stand frame (20) connects to the desktop frame (10) with at least one first joint (30); and two connection rods (300), fixedly connect the second table-on-wheel structure (200) to the first table-on-wheel structure (100) to form the combination table (700) in a way that the second side rod (12) of the first table-on-wheel structure (100) is close to the second side rod (12) of the second table-on-wheel structure (200), wherein the stand frame (20) of the first table-on-wheel structure (100) together with the stand frame (20) of the second table-on-wheel structure (200) stand the combination table (700) firmly on the ground.

8. The combination table (700) according to claim 7, wherein said stand frame (20) includes two foot posts (21).

9. The combination table (700) according to claim 8, wherein each said foot post (21) is independently extendable in length.

10. The combination table (700) according to claim 7, wherein said connection rods (300) are extendable in length.

11. The combination table (700) according to claim 7, further comprises a complementary table top (400) or a multipurpose complementary table top (410) set on top of said connection rods (300), or hanging on said connection rods (300) with plural hooks (411).

12. The combination table (700) according to claim 7, is being disassembled into a standalone first table-on-wheel structure (100) and a standalone second table-on-wheel structure (200) by detaching the two connection rods (300), and either the first table-on-wheel structure (100) or the second table-on-wheel structure (200) is being put on and attached firmly to a wheel (500) on a car with two said connection rods (300), and stands firmly on the ground with the stand frame (20) in a way that one connection rod (300) is placed on the wheel (500) with one end connected tight to the third side rod (13), the other connection rod (300) is placed on the wheel (500) with one end connected tight to the fourth side rod (14).

* * * * *